(12) United States Patent
Kidachi

(10) Patent No.: US 10,212,896 B2
(45) Date of Patent: Feb. 26, 2019

(54) EMITTER, AND TUBE FOR DRIP IRRIGATION

(71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/037,966

(22) PCT Filed: Nov. 26, 2014

(86) PCT No.: PCT/JP2014/081154
§ 371 (c)(1),
(2) Date: May 19, 2016

(87) PCT Pub. No.: WO2015/080116
PCT Pub. Date: Jun. 4, 2015

(65) Prior Publication Data
US 2016/0286741 A1  Oct. 6, 2016

(30) Foreign Application Priority Data
Nov. 27, 2013 (JP) .................. 2013-245228
Oct. 7, 2014 (JP) .................. 2014-206483

(51) Int. Cl.
*A01G 25/02* (2006.01)
*A01G 25/16* (2006.01)
(Continued)

(52) U.S. Cl.
CPC .......... *A01G 25/023* (2013.01); *A01G 25/16* (2013.01); *B05B 1/202* (2013.01); *B05B 1/3006* (2013.01); *A01G 25/02* (2013.01); *Y02A 40/237* (2018.01)

(58) Field of Classification Search
CPC .... A01G 25/02; A01G 25/023; A01G 25/165; B05B 12/008
(Continued)

(56) References Cited

U.S. PATENT DOCUMENTS 3,896,999 A * 7/1975 Barragan ............... A01G 25/02
239/107
4,143,820 A * 3/1979 Bright, Sr. ........... A01G 25/023
239/108
(Continued)

FOREIGN PATENT DOCUMENTS

CN  200987311 Y  12/2007
EP  2594339 A1  5/2013
(Continued)

OTHER PUBLICATIONS

International Search Report from International Application No. PCT/JP2014/081154 dated Mar. 3, 2015.
(Continued)

*Primary Examiner* — Jason Boeckmann
*Assistant Examiner* — Joseph A. Greenlund
(74) *Attorney, Agent, or Firm* — Brundidge & Stanger, P.C.

(57) ABSTRACT

An emitter (120) has, in a water intake part thereof, a water intake amount regulating part for preventing low-pressure liquid from flowing in. The water intake amount regulating part has a valve body (214) and a securing part (215). When the pressure of the liquid meant to flow into the emitter (120) is less than a set value, the valve body (214) does not move with the securing part (215), preventing the liquid from flowing into the emitter (120). When the pressure of the liquid is equal to or greater than the set value, the valve body (214) bends downstream to open the flow channel for the liquid.

6 Claims, 17 Drawing Sheets

(51) Int. Cl.
  *B05B 1/20* (2006.01)
  *B05B 1/30* (2006.01)
(58) Field of Classification Search
  USPC .................................................. 239/542, 547
  See application file for complete search history.

(56) References Cited

U.S. PATENT DOCUMENTS

| | | | | |
|---|---|---|---|---|
| 4,210,287 | A * | 7/1980 | Mehoudar | A01G 25/023 239/542 |
| 4,687,143 | A | 8/1987 | Gorney | |
| 5,111,995 | A * | 5/1992 | Dumitrascu | A01G 25/02 239/542 |
| 5,203,503 | A * | 4/1993 | Cohen | A01G 25/023 239/1 |
| 5,615,838 | A * | 4/1997 | Eckstein | A01G 25/023 239/533.1 |
| 5,711,482 | A * | 1/1998 | Yu | A01G 25/023 239/11 |
| 5,820,029 | A | 10/1998 | Marans | |
| 6,015,102 | A * | 1/2000 | Daigle | A01G 25/023 239/542 |
| 6,027,048 | A * | 2/2000 | Mehoudar | A01G 25/023 138/42 |
| 6,250,571 | B1 * | 6/2001 | Cohen | A01G 25/023 239/542 |
| 6,302,338 | B1 * | 10/2001 | Cohen | A01G 25/023 239/542 |
| 6,945,476 | B2 * | 9/2005 | Giuffre | A01G 25/023 239/542 |
| 7,648,085 | B2 * | 1/2010 | Mavrakis | A01G 25/023 239/542 |
| 8,511,585 | B2 * | 8/2013 | Keren | A01G 25/023 239/542 |
| 8,998,113 | B2 * | 4/2015 | Keren | A01G 25/023 239/542 |
| 9,345,205 | B2 * | 5/2016 | Kidachi | A01G 25/023 |
| 2002/0104903 | A1 * | 8/2002 | Eckstein | A01G 25/023 239/542 |
| 2003/0029937 | A1 * | 2/2003 | Dermitzakis | A01G 25/023 239/542 |
| 2005/0284966 | A1 * | 12/2005 | DeFrank | A01G 25/023 239/542 |
| 2006/0163388 | A1 * | 7/2006 | Mari | A01G 25/023 239/542 |
| 2009/0020634 | A1 * | 1/2009 | Schweitzer | A01G 25/023 239/542 |
| 2009/0266919 | A1 | 10/2009 | Mavrakis et al. | |
| 2009/0302127 | A1 * | 12/2009 | Lutzki | A01G 25/023 239/11 |
| 2010/0155508 | A1 * | 6/2010 | Keren | A01G 25/023 239/542 |
| 2010/0282873 | A1 * | 11/2010 | Mattlin | A01G 25/023 239/542 |
| 2012/0012682 | A1 * | 1/2012 | Einav | B05B 1/20 239/542 |
| 2012/0160926 | A1 * | 6/2012 | Lutzki | F16K 23/00 239/11 |
| 2012/0305676 | A1 | 12/2012 | Keren | |
| 2015/0201568 | A1 * | 7/2015 | Einav | A01G 25/023 239/542 |
| 2016/0057947 | A1 * | 3/2016 | Ensworth | A01G 25/023 239/542 |
| 2016/0113218 | A1 * | 4/2016 | Turk | A01G 25/02 239/542 |
| 2016/0286742 | A1 * | 10/2016 | Kidachi | A01G 25/023 |
| 2016/0295816 | A1 * | 10/2016 | Kidachi | A01G 25/023 |
| 2016/0309669 | A1 * | 10/2016 | Kidachi | A01G 25/02 |
| 2016/0330917 | A1 * | 11/2016 | Kidachi | A01G 25/023 |
| 2017/0035005 | A1 * | 2/2017 | Kidachi | A01G 25/023 |

FOREIGN PATENT DOCUMENTS

| | | |
|---|---|---|
| JP | 5-276842 A | 10/1993 |
| JP | 2010-046094 A | 3/2010 |
| WO | 2007/052272 A2 | 5/2007 |

OTHER PUBLICATIONS

Extended European Search Report for 14866245.5 dated Jun. 13, 2017.

\* cited by examiner

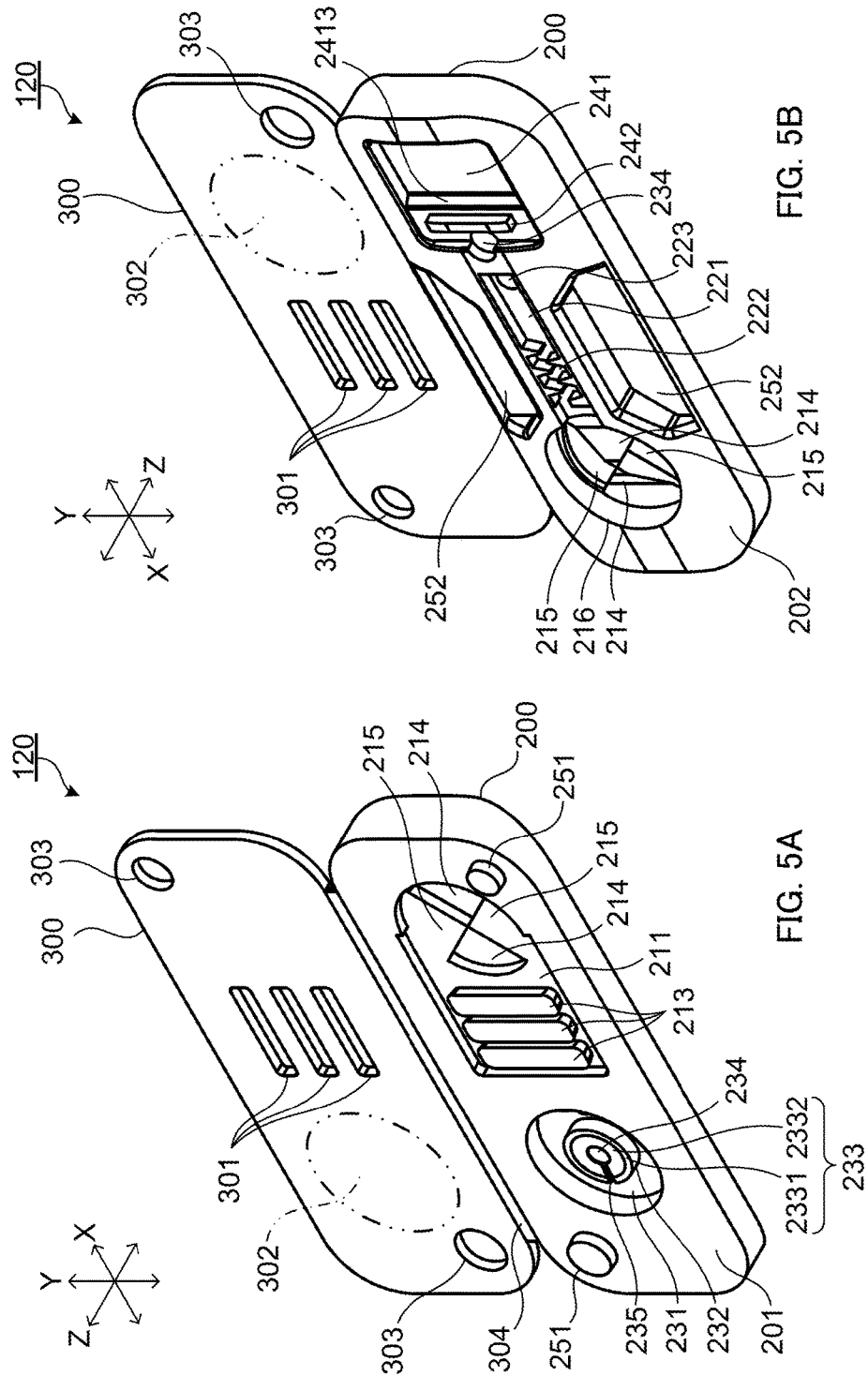

EMITTER, AND TUBE FOR DRIP IRRIGATION

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction channel for allowing the liquid having entered the emitter from the internal space of the tube to flow toward the through hole of the tube while reducing the pressure of the liquid, and a diaphragm part configured to change the volume of a portion of the channel where the irrigation liquid having reduced pressure flows in accordance with the pressure of the liquid of the space. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the liquid in the internal space of the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Further, in the case of a trickle irrigation tube, hundreds of emitters are disposed in one tube in some cases. In the case of a long trickle irrigation tube, the supply pressure of the liquid to the tube is required to be increased. However, when liquid flows out from the emitter before the pressure of the liquid in the tube is sufficiently increased, the pressure of the liquid in the tube is not easily increased, and discharge rate of the liquid in the emitter may be unstable. In view of this, control of the discharge rate of the liquid of the emitter in accordance with the pressure of the liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost. In addition, another object of the present invention is to provide a trickle irrigation tube having the emitter.

Solution to Problem

The present invention provides an emitter for quantitatively discharging irrigation liquid in a tube for distributing the irrigation liquid from a discharge port communicating between an inside and an outside of the tube when the emitter is joined to an inner wall surface of the tube at a position corresponding to the discharge port, the emitter including: an intake part for receiving the irrigation liquid in the tube; a liquid receiving amount regulating part for regulating a flow rate of the irrigation liquid received from the intake part; a pressure reduction channel for allowing the irrigation liquid supplied from the liquid receiving amount regulating part to flow therethrough while reducing a pressure of the irrigation liquid; a discharge rate regulating part for regulating the flow rate of the irrigation liquid supplied from the pressure reduction channel in accordance with a pressure of the irrigation liquid in the tube; a discharge part to which the irrigation liquid, having a flow rate regulated by the discharge rate regulating part, is supplied, the discharge part being to be facing the discharge port, in which: the liquid receiving amount regulating part includes a valve element which extends from a fixed end of a channel of the irrigation liquid in the emitter and opens to a downstream side when receiving a pressure of the irrigation liquid on an upstream side, the valve element includes a thin part having flexibility and extending from the fixed end, and a thick part extending from the thin part, and the thin part bends and the valve element opens to the downstream side when a pressure of the irrigation liquid on an upstream side of the liquid receiving amount regulating part is equal to or higher than a predetermined value.

In addition, the present invention provides an emitter which includes: an intake part for receiving irrigation liquid in a tube for distributing the irrigation liquid, the intake part having a cylindrical shape to be inserted to the tube from outside of the tube; a liquid receiving amount regulating part for regulating a flow rate of the irrigation liquid received from the intake part; a pressure reduction channel for allowing the irrigation liquid supplied from the liquid receiving amount regulating part to flow therethrough while reducing a pressure of the irrigation liquid; and a discharge rate regulating part for regulating the flow rate of the irrigation liquid supplied from the pressure reduction channel in accordance with a pressure of the irrigation liquid in the tube; a discharge part for discharging the irrigation liquid whose flow rate is regulated by the discharge rate regulating part to the outside of the tube; in which: a flange part is disposed at a base end of the intake part, the base end representing, when one end of the intake part from which the intake part is inserted to the tube is defined as a tip end, the other end of the intake part; the flange part is composed of a combination of a first disk part disposed at the base end of the intake part and a second disk part on which the discharge part is disposed, the flange part including at least the pressure reduction channel and the discharge rate regulating part; the liquid receiving amount regulating part includes a valve element which extends from a fixed end in a channel of the irrigation liquid in the emitter and opens to the downstream side when receiving a pressure of the irrigation liquid on an upstream side of the liquid receiving amount regulating part; the valve element includes a thin part having flexibility and extending from the fixed end, and a thick part extending from the thin part; and the thin part bends and the valve element opens to the downstream side when a pressure of the irrigation liquid on an upstream side of the liquid receiving amount regulating part is equal to or higher than a predetermined value.

Furthermore, the present invention provides a trickle irrigation tube which includes: a tube; and at least one emitter disposed on the tube, the emitter being the above-mentioned emitter.

Advantageous Effects of Invention

The emitter according to the present invention controls the inflow amount of the irrigation liquid to the emitter in accordance with the pressure of the irrigation liquid in the trickle irrigation tube, and thus can stabilize the discharge rate of the irrigation liquid of the emitter. In addition, since the emitter according to the present invention can be formed with one or two components by injection molding of a resin material, the manufacturing cost can be further reduced in comparison with conventional emitters composed of three parts.

BRIEF DESCRIPTION OF DRAWINGS

FIG. 5A illustrates a top surface, a front surface and a side surface of a molded article in a state before a film is joined to an emitter main body in Embodiment 1, and FIG. 5B is a bottom surface, a front surface and a side surface of the molded article;

DESCRIPTION OF EMBODIMENTS

In the following, embodiments of the present invention are described in detail with reference to the accompanying drawings.

[Embodiment 1]

Figure 1A:
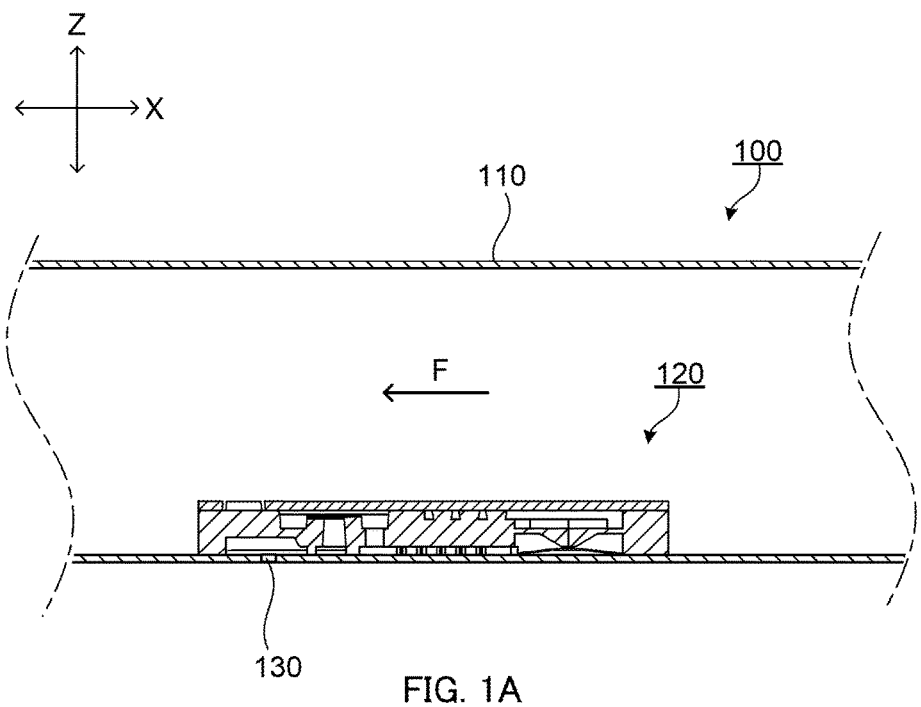
FIG. 1A is a schematic longitudinal sectional view of a trickle irrigation tube according to Embodiment 1 of the present invention.
Figure 1B:
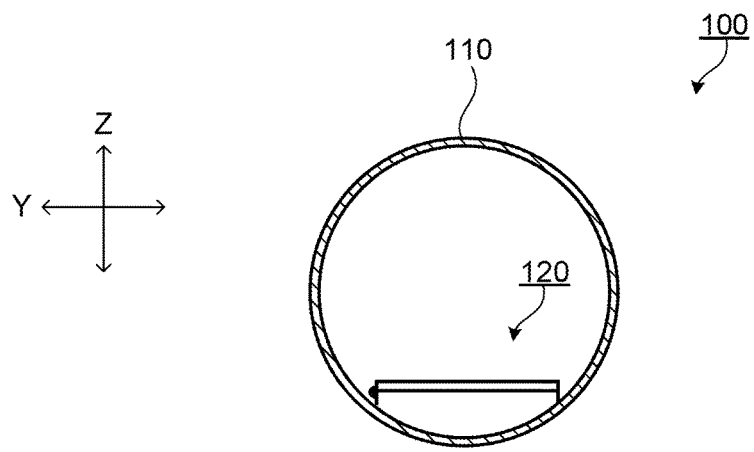
FIG. 1B is a schematic lateral sectional view of the trickle irrigation tube.

FIG. 1A is a schematic longitudinal sectional view of a trickle irrigation tube according to Embodiment 1 of the present invention, and FIG. 1B is a schematic lateral sectional view of the trickle irrigation tube the trickle irrigation tube. Trickle irrigation tube 100 is composed of tube 110 and emitter 120. Tube 110 is made of polyethylene, for example.

Emitter 120 is disposed at a predetermined interval (for example, 200 to 500 mm) in the axial direction of tube 110. Each emitter 120 is joined on the inner wall surface of tube 110. Emitter 120 is formed in a shape which can easily make close contact with tube 110. For example, in a cross-section taken along the XZ plane, the shape of the surface of emitter 120 to be joined to the inner wall surface (second surface described later) of tube 110 is a substantially arc shape protruding toward the inner wall surface of tube 110 so as to be coincide with the inner wall surface of tube 110 at the time of water supply. Emitter 120 is disposed at a position where emitter 120 covers discharge port 130 of tube 110. It is to be noted that the X direction is the axial direction of tube 110 or the longitudinal direction of emitter 120, the Y direction is the short (width) direction of emitter 120, and the Z direction is the height direction of emitter 120.

Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
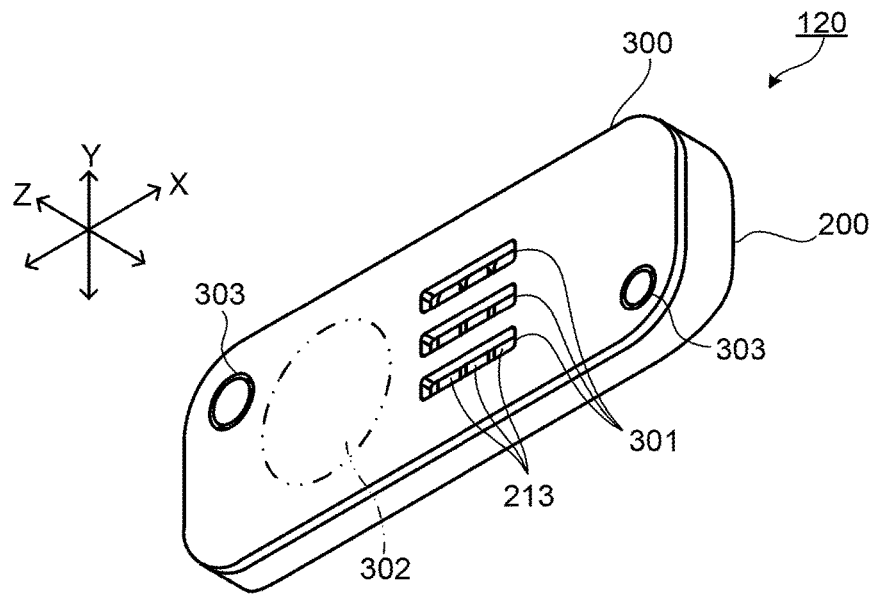
FIG. 2A illustrates a top surface, a front surface and a side surface of an emitter according to the embodiment.
Figure 2B:
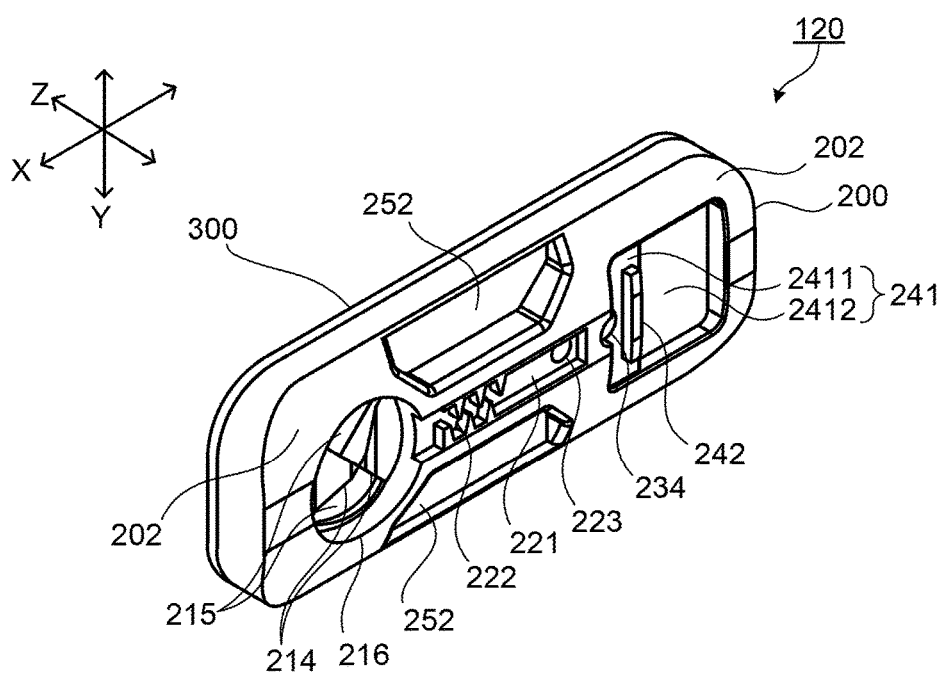
FIG. 2B illustrates a bottom surface, a front surface and a side surface of the emitter.
Figure 3A:
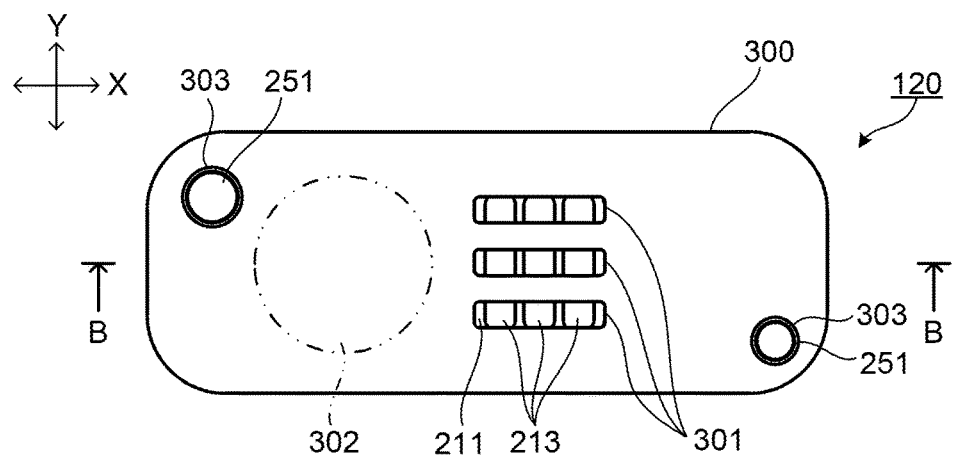
FIG. 3A is a plan view of the emitter according to Embodiment 1.
Figure 3B:
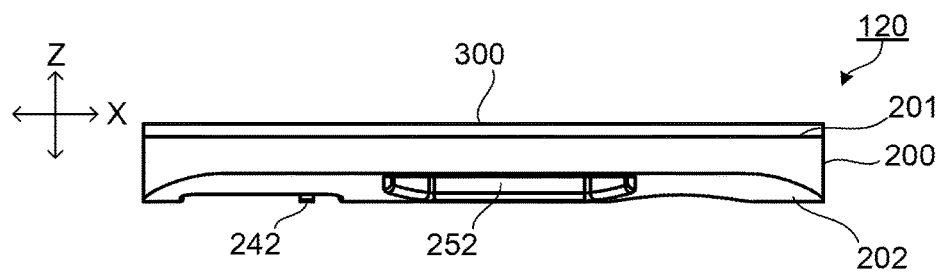
FIG. 3B is a front view of the emitter.
Figure 3C:
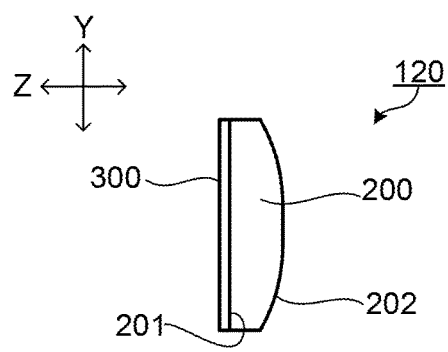
FIG. 3C is a side view of the emitter.
Figure 4A:
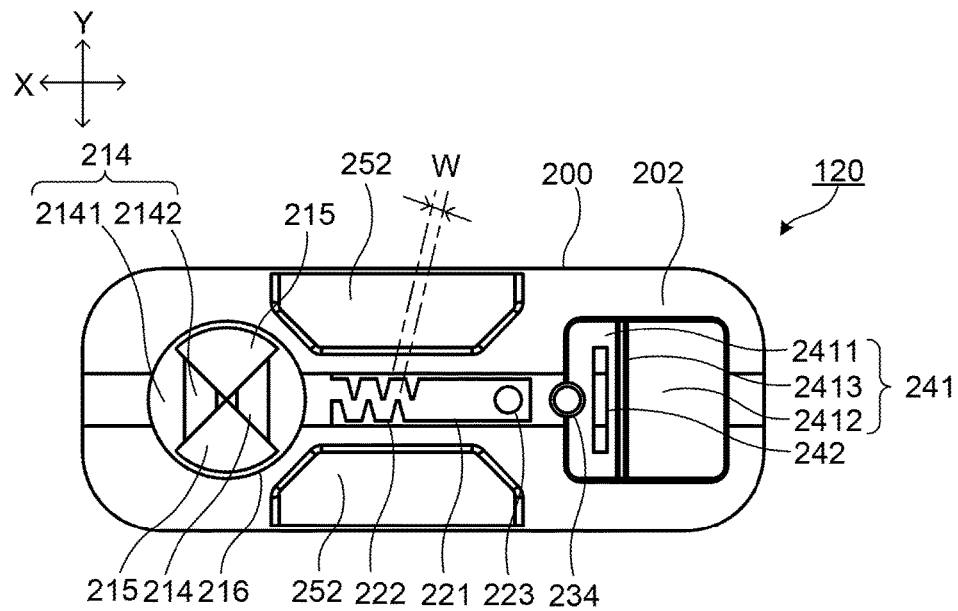
FIG. 4A is a bottom view of the emitter according to Embodiment 1.
Figure 4B:
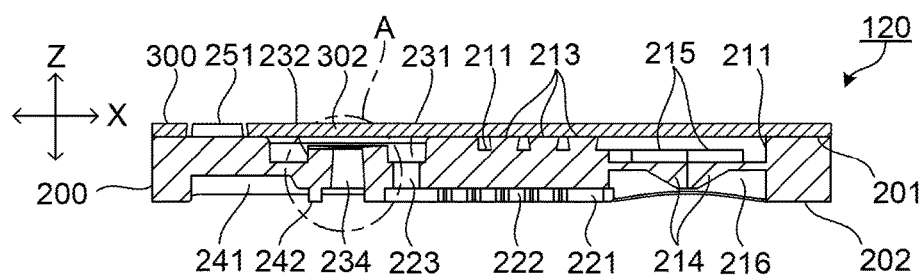
FIG. 4B is a sectional view of the emitter taken along line B-B of FIG. 3A.

FIG. 2A illustrates a top surface, a front surface and a side surface of emitter 120, and FIG. 2B illustrates a bottom surface, a front surface and a side surface of emitter 120. In addition, FIG. 3A is a plan view of emitter 120, FIG. 3B is a front view of emitter 120, and FIG. 3C is a side view of emitter 120. In addition, FIG. 4A is a bottom view of emitter 120, and FIG. 4B is a sectional view of emitter 120 taken along line B-B of FIG. 3A.

As illustrated in FIG. 2A and FIG. 2B, emitter 120 has a rectangular external shape. The shape in plan view (the shape along the Z direction) of emitter 120 is a substantially rectangular whose each corner is chamfered into a round form, and the lateral shape (the shape along the X direction) of emitter 120 is a shape (bell shape) composed of a semicircle and a rectangular continuous to the semicircle as described above. For example, the length of emitter 120 is 26 mm in the X direction, 10 mm in the Y direction, and 2.5 mm in the Z direction.

Emitter 120 includes emitter main body 200 to be joined to the inner wall surface of tube 110, and film 300 which is joined to emitter main body 200. First, film 300 is described.

Film 300 includes slit 301, diaphragm part 302 and positioning holes 303. Slit 301 is a slender opening extending along the X direction. Three slits 301 are disposed in parallel to each other at positions corresponding to protrusion line 213 described later film 300. Film 300 has a thickness of, for example, 0.5 mm.

Diaphragm part 302 is a portion of film 300 which is provided to overlap recess 231 and protrusion 232 described later. Diaphragm part 302 has a thickness equal to the thickness of other portions of film 300, and has a circular shape in plan view. It is to be noted that the thickness of diaphragm part 302 can be determined by a computer simulation or an experiment using a trial product or the like on the basis of the deformation amount under a pressure described later, for example.

Positioning holes 303 are two holes having a circular shape in plan view which extend through film 300, and for example, positioning holes 303 are disposed at positions corresponding to a pair of opposite corners on a diagonal line of film 300.

Next, emitter main body 200 is described. FIG. 5A illustrates a top surface, a front surface and a side surface of a molded article in the state where film 300 is joined to emitter main body 200, and FIG. 5B illustrates a bottom surface, a front surface and a side surface of the molded article. In addition, FIG. 6A is a plan view of the above-mentioned molded article, and FIG. 6B is a bottom view of the molded article.

As illustrated in FIG. 5A and FIG. 5B, emitter main body 200 includes first surface 201 and second surface 202. First surface 201 is one surface which is joined to film 300 in the Z direction. Second surface 202 is the other surface which is joined to the inner wall surface of tube 110 in the Z direction. First surface 201 is a planar surface, and second surface 202 is a non-planar surface having a substantially half cylindrical shape.

Figure 6A:
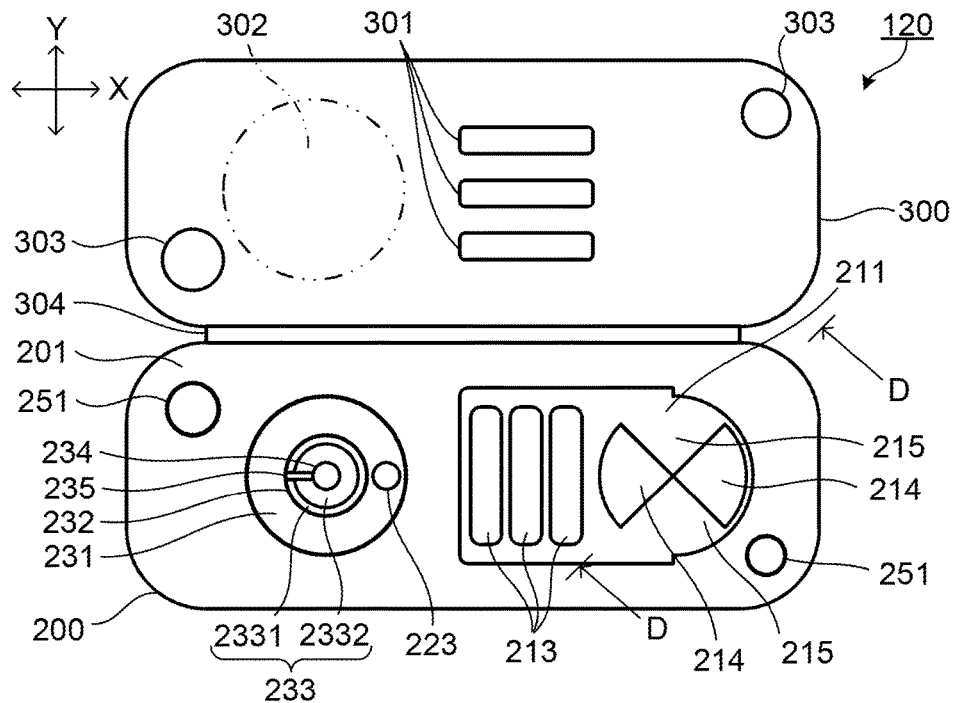
FIG. 6A is a plan view of the molded article in a state before a film is joined to an emitter main body in Embodiment 1.
Figure 6B:
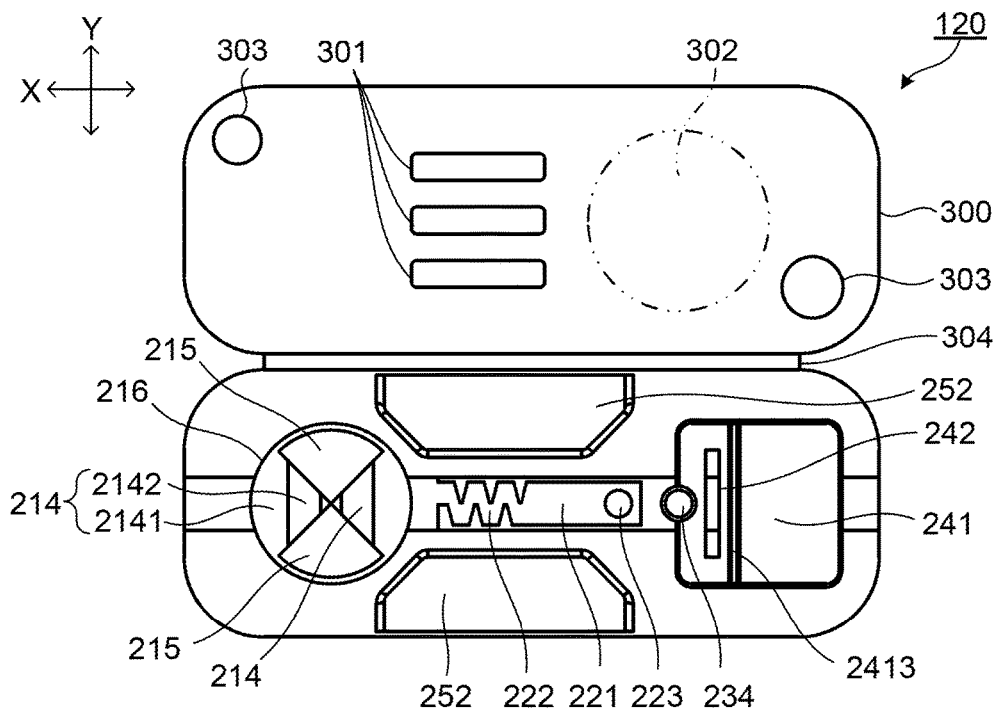
FIG. 6B is a bottom view of the molded article.

As illustrated in FIG. 5A, FIG. 6A and FIG. 6B, emitter main body 200 is integrally disposed with film 300 through hinge part 304. Hinge part 304 is disposed at an edge of first surface 201 of emitter main body 200 in the Y direction. For example, hinge part 304 is a portion having a thickness equal to that of film 300 and a width of 0.5 mm, and is formed integrally with emitter main body 200 and film 300.

As illustrated in FIG. 5A and FIG. 5B, emitter main body 200 includes recess 211, protrusion line 213 disposed in recess 211, valve element 214 and fixed part 215 formed on the bottom surface of recess 211, and recess 216 provided from second surface 202 to valve element 214 and fixed part 215. It is to be noted that a intake part is composed of slit 301, recess 211 and protrusion line 213. A liquid receiving amount regulating part is composed of valve element 214 and fixed part 215.

In plan view, recess 211 has a bell shape composed of a rectangular and a semicircle continuous from one side of the rectangular, and the depth of recess 211 from first surface 201 is, for example, 0.5 mm. The diameter of the semicircle part of the bell shape is, for example, 6 mm.

Protrusion line 213 is three slender protrusions which are disposed in the rectangular part of recess 211 in plan view in parallel to each other whose longitudinal direction is aligned with the Y direction. The height of protrusion line 213 from the bottom surface of recess 211 to the tip end of protrusion line 213 is, for example, 0.5 mm A gap is provided between protrusion lines 213 or between protrusion line 213 and the wall surface of recess 211 in the X direction, and in addition, a gap is provided between the end portion of protrusion line 213 and the wall surface of recess 211 in the Y direction. As illustrated in FIG. 4B, protrusion line 213 is formed to have a shape in which the base end portion is narrower than the tip end portion in a cross-section taken along the XZ plane. That is, the gap between protrusion lines 213 or between protrusion line 213 and the wall surface of recess 211 in the X direction increases as the depth of recess 211 increases. The angle of the wall surface of protrusion line 213 to the bottom surface of recess 211 is, for example, 80 to 84°. Thus, protrusion line 213 forms a so-called wedge wire structure in recess 211.

In plan view, each of valve element 214 and fixed part 215 is a circular sector which is obtained by dividing a circle into four parts, and valve element 214 and fixed part 215 are alternately disposed in the circumferential direction. Fixed part 215 is composed of a flat plate, and one surface of the flat plate is flush with the bottom surface of recess 211. The arc portion of valve element 214 is a fixed end, and the radius of valve element 214 is a free end. Valve element 214 is disposed at a position depressed by the thickness of fixed part 215 from the bottom surface of recess 211. That is, the free end edge of valve element 214 on the upstream side is in contact with the free end edge of fixed part 215 on the downstream side. Valve element 214 and fixed part 215 are disposed at positions where the free ends of valve element 214 and fixed part 215 intersect with each other at 45° with respect to the X direction or the Y direction in plan view.

As illustrated in FIG. 6B, valve element 214 is composed of flexible thin part 2141 extending from the fixed end and thick part 2142 extending from thin part 2141. The thickness of thin part 2141 is uniform from the arc as the fixed end, and is sufficiently thin relative to fixed part 215.

The thickness of thick part 2142 is greater than the thickness of thin part 2142 on a downstream side of the valve element 214. Thick part 2142 has a substantially triangular pyramidal shape protruding toward recess 216, for example. The bottom surface of thick part 2142 has a rectangular equilateral triangular shape with the vertex at the center of the circular sector of valve element 214, and has two wall surfaces provided in an upright manner from the free end on the downstream side, and a tilted surface obliquely extending toward the downstream side from the hypotenuse of the rectangular triangle. In plan view, the boundary between thin part 2141 and thick part 2142 is a straight line. The apex of thick part 2142 is slightly cut out such that, for example, the distance between the inner wall surface of tube 110 and thick part 2142 is about 0.5 mm when emitter 120 is joined to tube 110.

In plan view, recess 216 has a circular shape whose diameter is equal to that of the semicircle of the bell shape of recess 211, and the bottom part thereof is composed of valve element 214 and fixed part 215, as illustrated in FIG. 5B.

As illustrated in FIG. 5B and FIG. 6B, emitter main body 200 includes recess 221. Recess 221 is a groove extending along the X direction on second surface 202. One end of recess 221 is in communication with recess 216, and recess 221 has a substantially rectangular shape in plan view. The depth of recess 221 from second surface 202 is, for example, 0.5 mm. Recess 221 includes pressure reduction channel part 222 and hole 223.

In plan view, pressure reduction channel part 222 is a portion formed as a groove having a zigzag shape. In the zigzag shape, protrusions having a substantially triangular prism shape protruding from the side surface of recess 221 are alternately disposed along the longitudinal direction (the X direction) of recess 221. In plan view, the protrusions are disposed such that the tip of each protrusion does not exceed the central axis of recess 221. Pressure reduction channel part 222 has a depth of, for example, 0.5 mm, and the channel of pressure reduction channel part 222 has a width (W in FIG. 4A) of, for example, 0.5 mm.

Hole 223 opens at the other end part of recess 221, and extends through emitter main body 200.

As illustrated in FIG. 5A and FIG. 6A, emitter main body 200 includes recess 231, protrusion 232, end surface 233, hole 234 and groove 235. A discharge rate regulating part is composed of diaphragm part 302, protrusion 232, end surface 233, hole 234 and groove 235.

Recess 231 is a bottomed recess which opens to first surface 201. In plan view, recess 231 has a circular shape, and hole 234 opens at the bottom of recess 231. The circular shape has a diameter of, for example, 6 mm, and first surface 201 has a depth from recess 231 of, for example, 2 mm.

Protrusion 232 is a substantially cylindrical thick body which is uprightly provided at a center portion of the bottom of recess 231. The height of protrusion 232 is smaller than the depth of recess 231. For example, the distance from first surface 201 to protrusion 232 in the Z direction is 0.25 mm.

Figure 8A:
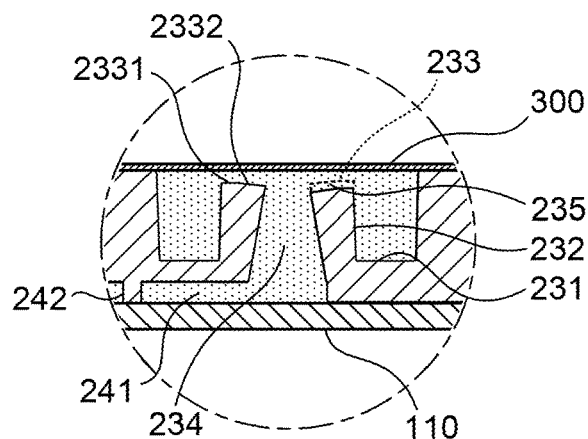
FIG. 8A illustrates part A of the emitter according to Embodiment 1 in FIG. 4B in an enlarged manner in the case where the pressure of the irrigation liquid in the tube is equal to or higher than a first predetermined value.

End surface 233 is a tip end surface of protrusion 232. In plan view, end surface 233 has a circular shape, and has a diameter of, for example, 3 mm. End surface 233 includes outer ring part 2331 which is parallel to the XY plane, and tilted surface 2332 which is tilted to second surface 202 side from the inner peripheral edge of outer ring part 2331 toward the center portion of end surface 233 (FIG. 8A).

Tilted surface 2332 is a curved surface which is slightly depressed with respect to first surface 201 side. Tilted surface 2332 is formed to overlap a virtual curve which is in contact with the opening edges of recess 231 in a cross-section including the central axis of recess 231. The virtual curve includes a curve which is defined by diaphragm part 302 when the irrigation liquid in tube 110 receives a pressure having a value equal to or higher than a predetermined value in the above-mentioned cross-section (FIG. 8A and FIG. 8C).

The curve has curvature radius R of 12 mm for example. Thus, tilted surface 2332 is a valve seat part on which diaphragm part 302 can sit.

Hole 234 opens at a center of end surface 233, and extends through emitter main body 200. Hole 234 is a tapered hole whose diameter gradually increases from end surface 233 side toward recess 241 side in the Z direction. The opening of hole 234 on end surface 233 side is smaller than the opening of hole 234 on recess 241 side, and the hole diameter of hole 234 on end surface 233 side is, for example, 1 mm.

Groove 235 is formed on end surface 233 in a range from the outer peripheral edge of end surface 233 to hole 234. That is, groove 235 communicates between recess 231 and hole 234. One or more grooves 235 may be provided. For example, groove 235 has a width of 2 mm, and a depth of 0.05 mm.

As illustrated in FIG. 5B and FIG. 6B, emitter main body 200 includes recess 241 and protrusion line 242. Recess 241 is a discharge part configured to face discharge port 130.

In plan view, recess 241 has a substantially rectangular shape. To be more specific, in plan view, recess 241 has a shape composed of a combination of first portion 2411 on recess 221 side in the X direction, second portion 2412 having a greater depth, tilted part 2413 which connects first portion 2411 and second portion 2412, and hole 234 which opens at an edge of first portion 2411 on recess 221 side. Thus, in plan view, recess 241 has a shape in which a semicircle of hole 234 is connected to one side of a rectangular. In plan view, each of first portion 2411 and second portion 2412 has a substantially rectangular shape. The inclination angle of tilted part 2413 to the bottom surface of second portion 2412 is, for example, 60°.

Protrusion line 242 is provided at first portion 2411 along the boundary to tilted part 2413. The height of protrusion line 242 is equal to the depth of first portion 2411. In the X direction, protrusion line 242 is separated from hole 234. In the Y direction, the length of protrusion line 242 is smaller than the length of first portion 2411, and each of both ends of protrusion line 242 is separated from the inner wall surface of first portion 2411. Thus, protrusion line 242 is disposed to completely overlap hole 234 as viewed from second portion 2412 side along the X direction.

In addition, emitter main body 200 includes protrusion 251 protruding from first surface 201 as illustrated in FIG.

5A and FIG. 6A, and recess 252 which opens at second surface 202 as illustrated in FIG. 5B and FIG. 6B.

In plan view, protrusion 251 has a circular shape, and has a size which fits with the positioning hole 303 of film 300. Each protrusion 251 is disposed at a position corresponding to positioning hole 303.

Each recess 252 is disposed between recess 216 and recess 241 in the X direction, and between recess 221 and the side edge of emitter main body 200 in the Y direction.

Each of emitter main body 200 and film 300 is molded with one material having flexibility such as polypropylene, for example. Examples of the material include resin and rubber, and examples of the resin include polyethylene and silicone. The flexibility of emitter main body 200 and film 300 can be adjusted with use of elastic resin materials, and for example, can be adjusted by the type of an elastic resin, the mixing ratio of an elastic resin material to a hard resin material, and the like. An integrally molded member of emitter main body 200 and film 300 can be manufactured by injection molding, for example.

Emitter 120 is composed by turning film 300 about hinge part 304 so as to join film 300 to first surface 201 of emitter main body 200. For example, film 300 is joined to emitter main body 200 by welding of a resin material of emitter main body 200 or film 300, by bonding using an adhesive agent, by pressure bonding of film 300 to emitter main body 200 or the like. By joining film 300 to first surface 201, recess 231 is liquid-tightly sealed with diaphragm part 302, and recess 231 becomes a part of a channel of irrigation liquid in emitter 120. In this manner, the above-mentioned serial channel from recess 211 to recess 241 is formed. It is to be noted that hinge part 304 may be left as it is, or may be removed by cutting off hinge part 304.

Trickle irrigation tube 100 is composed by joining second surface 202 of emitter 120 to the inner wall surface of tube 110. Emitter 120 is joined to the internal surface of tube 110 by welding of the resin material of emitter main body 200 or tube 110, by bonding using adhesive agent, by pressure bonding of emitter main body 200 to tube 110, or the like. Discharge port 130 is formed to open at second portion 2412 in emitter 120. While discharge port 130 is normally formed after emitter 120 is joined to tube 110, discharge port 130 may be formed before emitter 120 is joined to tube 110.

Next, flow of irrigation liquid in emitter 120 is described. First, water is supplied into tube 110 as irrigation liquid, for example. Examples of the irrigation liquid include water, liquid fertilizer, agricultural chemicals and mixtures thereof. Supply of water to trickle irrigation tube 100 is performed in a range where the pressure of the water does not exceed 0.1 MPa in view of preventing damaging of tube 100 and emitter 120. The water in tube 110 passes through slit 301 of film 300, and through a gap between recess 211 and protrusion line 213.

Since the longitudinal direction of slit 301 and the longitudinal direction of protrusion line 213 intersect with each other, the openings of recess 211 to tube 110 are scattered and the planar dimension of each opening is small. Thus, intrusion of floating materials in the water in tube 110 to recess 211 is suppressed. In addition, since protrusion line 213 forms a so-called wedge wire structure, pressure drop of the water flowing into recess 211 is suppressed.

Figure 7A:
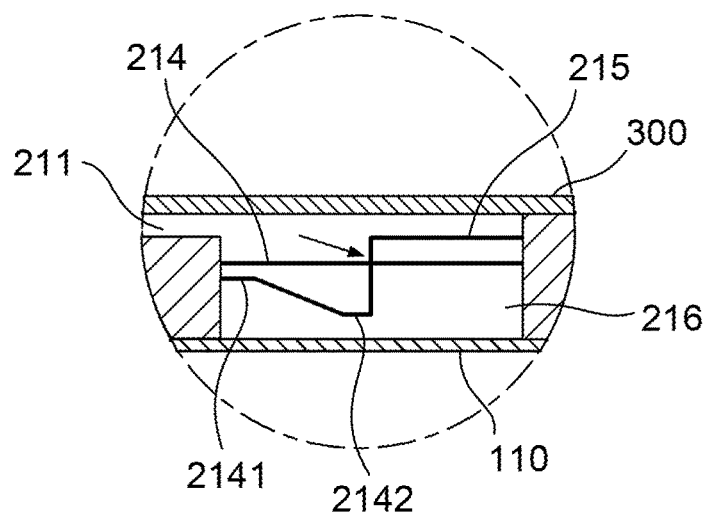
FIG. 7A illustrates a cross-section of the emitter according to Embodiment 1 taken along line D-D of FIG. 6A in an enlarged manner in the case where the pressure of the irrigation liquid in the tube is lower than the predetermined value.
Figure 7B:
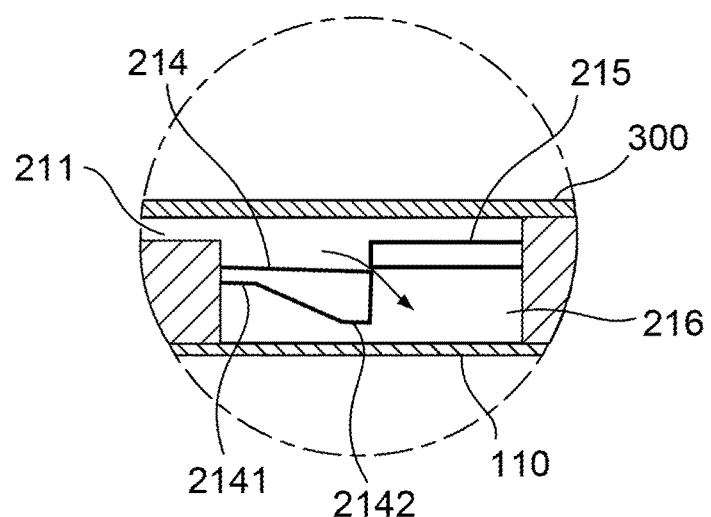
FIG. 7B illustrates a cross-section of the emitter taken along line D-D of FIG. 6A in an enlarged manner in the case where the pressure of the irrigation liquid in the tube is equal to or higher than the predetermined value.

The water in recess 211 reaches the positions of valve element 214 and fixed part 215 in recess 211. FIG. 7A illustrates a cross-section of value emitter 120 taken along line D-D of FIG. 6A in an enlarged manner in the case where the pressure of the water in tube 110 is smaller than a predetermined, and FIG. 7B illustrates a cross-section of emitter 120 taken along line D-D of FIG. 6A in an enlarged manner in the case where the pressure of the water in tube 110 is equal to or higher than predetermined value. The arrows in FIGS. 7A and 7B indicate the flow of the water.

The water in recess 211 presses valve element 214 and fixed part 215 from recess 211 side toward recess 216. As illustrated in FIG. 7A, when the water pressure in recess 211 is lower than a predetermined value (for example, 0.005 MPa), both valve element 214 and fixed part 215 do not bend to recess 216 side, and the water channel is closed by valve element 214 and fixed part 215.

As illustrated in FIG. 7B, since thin part 2141 is thinner than fixed part 215, when the water pressure in recess 211 is equal to or higher than the predetermined value, only thin part 2141 bends whereas fixed part 215 does not bend, and, only valve element 214 opens to recess 216 side whereas fixed part 215 does not open to recess 216 side. In this manner, a gap is formed between valve element 214 and fixed part 215, and the water in recess 211 is supplied to recess 216 through the gap.

The water in recess 216 is supplied to pressure reduction channel part 222 through recess 221. The pressure of the water flowing through pressure reduction channel part 222 is reduced as a result of pressure reduction caused by the shape (zigzag shape) in plan view of pressure reduction channel part 222. In addition, floating materials in the water are entangled in the turbulent flow generated between the protrusions of pressure reduction channel part 222 and are retained in pressure reduction channel part 222. In this manner, the floating materials are further removed from the water by pressure reduction channel part 222.

The water having passed through pressure reduction channel part 222 in which the pressure is reduced and the floating materials are removed is supplied into recess 241 through hole 223.

Figure 8B:
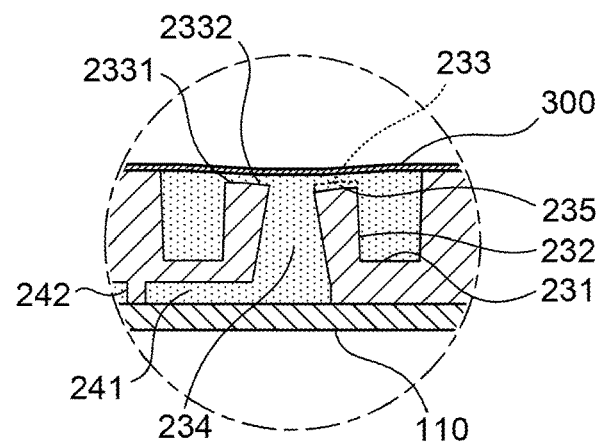
FIG. 8B illustrates the part A of the emitter in an enlarged manner in the case where the pressure in the tube is equal to or higher than the first predetermined value and lower than a second predetermined value.
Figure 8C:
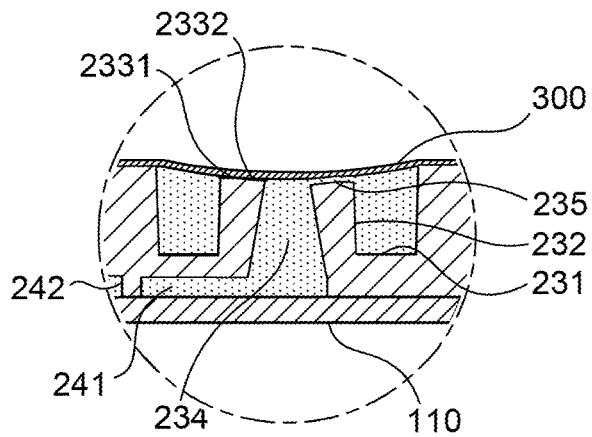
FIG. 8C illustrates the part A of the emitter in an enlarged manner in the case where the pressure in the tube is equal to or higher than the second predetermined value.

Here, FIG. 8A illustrates part A of FIG. 4B in an enlarged manner in the case where the water pressure in tube 110 is equal to or higher than first predetermined value, FIG. 8B illustrates the part A in an enlarged manner in the case where the water pressure in tube 110 is equal to or higher than the first predetermined value and lower than the second predetermined value, and FIG. 8C illustrates the part A in an enlarged manner in the case where the water pressure in tube 110 is equal to or higher than the second predetermined value.

When recess 241 is filled with the water, the water is supplied to hole 234 through a gap between film 300 and end surface 233 as illustrated in FIG. 8A. When the water pressure in tube 110 is equal to or higher than the first predetermined value (for example, 0.02 MPa), the flow rate of the water at the intake part increases and the amount of the water supplied to recess 231 increases, as the water pressure in tube 110 increases.

Meanwhile, when the water pressure in tube 110 is equal to or higher than the first predetermined value, diaphragm part 302 is pushed and bent by the water in tube 110 to recess 231 side as illustrated in FIG. 8B. As a result, the distance between diaphragm part 302 and end surface 233 decreases. For example, the distance between end surface 233 and diaphragm part 302 is changed to 0.15 mm. Consequently, the amount of the water which flows through the gap between end surface 233 and diaphragm part 302 decreases.

As illustrated in FIG. 8C, when the pressure of the irrigation liquid in tube 110 is equal to or higher than the second predetermined value (for example, 0.05 MPa), diaphragm part 302 is further pushed to recess 231 side and further bent to make close contact with tilted surface 2332.

While hole 234 is sealed with diaphragm part 302, end surface 233 includes groove 235, and thus groove 235 communicates between recess 231 and hole 234. Consequently, the water in recess 231 is supplied from recess 231 to hole 234 through groove 235. Consequently, when the water pressure is high, the flow rate of the water at hole 234 is restricted to a constant flow rate which can pass through groove 235.

The water having passed through hole 234 is supplied to recess 241. That is, the water having passed through hole 234 is, first, supplied to first portion 2411, and then supplied to second portion 2412 through the gap between the inner wall surface of recess 241 and protrusion line 242. The water supplied to second portion 2412 flows out of tube 110 through discharge port 130 which opens at second portion 2412.

It is to be noted that, when trickle irrigation tube 100 is used, the roots of the plant may intrude into recess 241 of discharge port 130 for water. Such intrusion of foreign matters is blocked by protrusion line 242. Consequently, it is possible to prevent hole 234 from being closed by foreign matters.

As described, emitter 120 is an emitter for quantitatively discharging irrigation liquid (water) in tube 110 for distributing the irrigation liquid from discharge port 130 communicating between an inside and an outside of tube 110 when emitter 120 is joined to an inner wall surface of tube 110 at a position corresponding to the discharge port 130, emitter 120 including: an intake part for receiving the irrigation liquid in tube 110; a liquid receiving amount regulating part for regulating a flow rate of the irrigation liquid received from the intake part; pressure reduction channel 222 for allowing the irrigation liquid supplied from the liquid receiving amount regulating part to flow therethrough while reducing a pressure of the irrigation liquid; a discharge rate regulating part for regulating the flow rate of the irrigation liquid supplied from the pressure reduction channel 222 in accordance with the pressure of the irrigation liquid in tube 110; a discharge part to which the irrigation liquid, having a flow rate regulated by the discharge rate regulating part, is supplied, the discharge part being to be facing the discharge port 130, in which: the liquid receiving amount regulating part includes a valve element 214 which extends from a fixed end of the channel of the irrigation liquid in emitter 120, and opens to a downstream side when receiving a pressure of the irrigation liquid on an upstream side, valve element 214 includes thin part 2141 having flexibility and extending from the fixed end, and thick part 2142 extending from thin part 2141, and thin part 2141 bends and valve element 214 opens to the downstream side when a pressure of the irrigation liquid on an upstream side of the liquid receiving amount regulating part is equal to or higher than a predetermined value.

As described, emitter 120 includes valve element 214, and therefore, when the water pressure in tube 110 is low, emitter 120 can stop inflow of water to emitter 120, and can stop outflow of the water from discharge port 130. Accordingly, the pressure in tube 110 is sufficiently and immediately maintained at a high pressure, and the discharge rate of the water in tube 110 can be stabilized.

Further, since the above-described components of emitter 120 in emitter main body 200 are composed of a recess and a through hole formed on emitter main body 200, emitter main body 200 having the components can be integrally produced by injection molding. Therefore, the manufacturing cost of emitter 120 can be further reduced in comparison with conventional emitters composed of three parts.

In addition, the configuration in which the boundary between thick part 2142 and thin part 2141 has a straight line shape in plan view and the thickness of thick part 2142 is greater than the thickness of thin part 2141 on the downstream side of valve element 214 is further effective from the viewpoint of increasing the ease of opening of valve element 214 to the downstream side, the viewpoint of reducing the predetermined value for opening and closing valve element 214, and the viewpoint of more precisely performing the opening and closing of valve element 214.

In addition, the configuration in which the liquid receiving amount regulating part further includes fixed part 215 disposed at a position adjacent to valve element 214 in plan view, each of valve element 214 and fixed part 215 has a circular sector shape in plan view, and valve element 214 and fixed part 215 are alternately disposed in the circumferential direction in plan view is further effective from the viewpoint of increasing the productivity of emitter main body 200 by injection molding.

In addition, with the configuration in which emitter 120 is molded with one material having flexibility and film 300 is integrally molded as a part of emitter 120, both of emitter main body 200 and film 300 can be molded as one component by injection molding, which is further effective from the viewpoint of preventing manufacturing error of the joining position of film 300, and further reducing manufacturing cost, for example.

In addition, the discharge rate regulating part includes: film 300 having flexibility and disposed to block a communication of a channel on a downstream side of pressure reduction part 222 and the inside of tube 110, end surface 233 depressed with respect to the film 300 and disposed at the channel on the downstream side of pressure reduction part 222 without making contact with the film 300, the end surface 233 being capable of making close contact with the film 300, hole 234 which opens to the end surface 233 and is in communication with the discharge part, groove 235 formed at the end surface 233 and communicating between the hole 234 and the channel located outside relative to the end surface 233, and the film 300 makes close contact with the end surface 233 when a pressure of the irrigation liquid in the tube 110 is equal to or higher than a predetermined value. This configuration is further effective from the viewpoint of preventing water from excessively flowing out from emitter 120 when the water pressure in tube 110 is high such that the water is stably discharged from emitter 120 with a desired amount regardless of the water pressure in tube 110.

In addition, the configuration in which end surface 233 includes tilted surface 2332 which can make close contact with diaphragm part 302 deformed by the water pressure in tube 110 is further effective from the viewpoint of stably discharging the water from emitter 120 at a desired rate.

In addition, emitter 120 includes a screen part composed of slit 301 which opens to the inside of tube 110, and a recess as a gap which is in communication with slit 301 and extends in a direction which intersects with orthogonal to the longitudinal direction of slit 301, the recess being disposed between protrusion lines 213 and between protrusion line 213 and the wall surface of recess 211. This configuration is further effective from the viewpoint of catching the floating material of the water received by emitter 120 from the inside of tube 110, and preventing variation of the flow rate of the water in emitter 120 due to the floating material.

In addition, the configuration in which emitter main body 200 has a substantially arc cross-sectional shape as viewed in the YZ plane in second surface 202 is further effective from the viewpoint of increasing the joining strength of emitter 120 to the inner wall surface of tube 110.

In addition, the configuration in which emitter main body 200 includes protrusion 251 is further effective from the viewpoint of further readily and correctly joining film 300 to a desired position, the viewpoint of increasing productivity, and the viewpoint of reducing variation in quality due to manufacturing error.

In addition, the configuration in which emitter main body 200 includes recess 252 (thickness-reducing hole) is further effective from the viewpoint of increasing the molding accuracy of emitter main body 200, the viewpoint of increasing productivity, and the viewpoint of ensuring desired quality.

In addition, the configuration in which each of valve element 214 and fixed part 215 adjacent to each other has a fan-shape, and valve element 214 and fixed part 215 are disposed such that the free end edge of valve element 214 on the upstream side is in contact with the free end edge of fixed part 215 on the downstream side does not require cutting work of valve element 214 and fixed part 215 and is therefore further effective from the viewpoint of molding both of valve element 214 and fixed part 215 at one time only by injection molding.

In addition, the configuration in which recess 241 is composed of shallow first portion 2411 on the upstream side and deep second portion 2412 on the downstream side is effective from the viewpoint of preventing intrusion of plant roots from discharge port 130 to the upstream side, and the configuration in which protrusion line 242 is further disposed to first portion 2411 is further effective from the above-mentioned viewpoint.

In addition, the configuration in which film 300 has slit 301 which intersects with protrusion line 213 in recess 211 in plan view is effective in readily forming a large number of entrances of the channel in emitter 120 each having a small planar dimension, and in addition, is effective from the viewpoint of preventing intrusion of the floating materials of the water in tube 110 to emitter 120.

It is to be noted that, as long as the above-described effect is achieved, the above-mentioned configurations of trickle irrigation tube 100 or emitter 120 may be partially changed, or trickle irrigation tube 100 or emitter 120 may further have other configurations.

For example, tube 110 may be a seamless tube, or a tube composed of slender sheet(s) joined together along the longitudinal direction.

In addition, discharge port 130 may be a gap formed at the above-mentioned joining part of the sheet(s) so as to communicate between the inside and the outside of tube 110, or a pipe sandwiched by the sheets at the joining part. Further, the shape of the discharge port in the axial direction may not be a straight line shape. Examples of the tube having the discharge port include a tube in which a depression having a desired shape and serving as a channel is formed on the surface of the above-mentioned sheet(s), and a discharge port composed of the channel is formed at the joining part when the sheets are joined together.

While the intake part is located at a position on the upstream side in the flow direction of the water in tube 110, the intake part may be located at a position on the downstream side. In addition, the orientations of a plurality of emitters in one tube 110 may be identical to each other or different from each other.

In addition, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the components on the first surface 201 side are molded integrally with film 300. With the configuration in which emitter main body 200 is composed of the two components, a channel such as the pressure reduction channel can be disposed inside emitter main body 200. It is to be noted that the two components may be integrally molded through a hinge part.

While the screen part is composed of a plurality of parallel slits 301 and a plurality of parallel recesses extending in a direction intersecting with the longitudinal direction of slit 301, the number of each of slit 301 and the recess may be one. While the screen part includes the wedge wire structure, such a structure may not be included. For example, protrusion line 213 may be uprightly provided on the bottom of recess 211 at a right angle.

While the liquid receiving amount regulating part is composed of valve element 214 and fixed part 215, valve element 214 and fixed part 215 may not be alternately disposed in a plane direction (circumferential direction), or the liquid receiving amount regulating part may not include fixed part 215 and may be composed only of valve element 214. In addition, valve element 214 may be a segment having a uniform thickness as long as valve element 214 is a valve element which appropriately opens with a pressure equal to or higher than a predetermined water pressure.

In addition, pressure reduction channel part 222 may have any configuration as long as the pressure reduction part can appropriately reduce the pressure of the water to be supplied to the discharge rate regulating part, and may be a channel having a linear shape in plan view, or, a channel whose planar dimension changes in accordance with the water pressure in tube 110, for example. In addition, the pressure reduction channel may be a groove on first surface 201 which is covered with film 300 in emitter main body 200.

While the valve seat part of the present embodiment is tilted surface 2332 which forms a recessed surface part which can make close contact with diaphragm part 302, other suitable configurations may also be adopted as long as the valve seat part can make close contact with diaphragm part 302 at a position around hole 234, and for example, the valve seat part may be a plane surface part.

While, in the discharge rate regulating part, diaphragm part 302 directly performs opening and closing of channel (hole 234) in emitter 120, the discharge rate regulating part may also have a configuration in which a closure capable of opening and closing the channel in emitter 120 is opened and closed by bringing diaphragm part 302 close to the closure and separating diaphragm part 302 from the closure. Also with the discharge rate regulating part having such a configuration, the discharge rate can be appropriately regulated in accordance with the water pressure in tube 110.

In addition, as long as the intrusion prevention part can block intrusion of roots or the like from discharge port 130 to hole 234, the intrusion prevention part may not be the above-mentioned flow guide member. For example, the intrusion prevention part may be a grid member or a screen disposed at a position of the flow guide member, or a baffle plate which is disposed to guide the intruded roots to the side opposite to hole 234 from discharge port 130.

It is to be noted that second surface 202 may also be a planar surface.

[Embodiment 2]

Now Embodiment 2 of the present invention is described.

Figure 9:
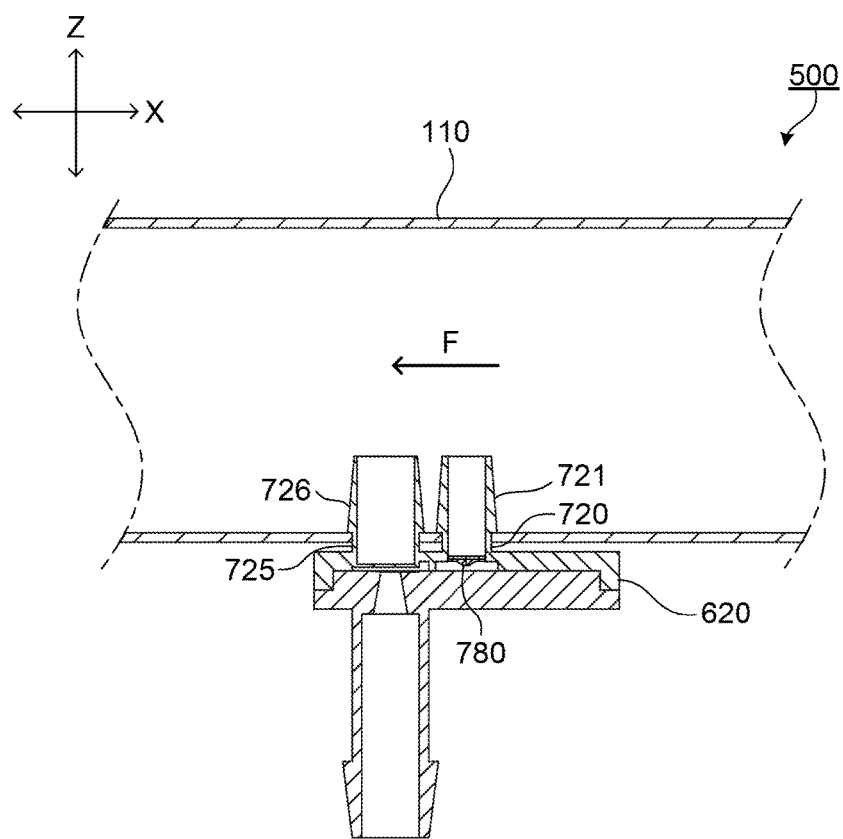
FIG. 9 is a schematic sectional view of a trickle irrigation tube according to Embodiment 2 of the present invention.

FIG. 9 is a schematic sectional view of trickle irrigation tube 500 according to Embodiment 2 of the present invention. Trickle irrigation tube 500 is composed of tube 110 and emitter 620. The configuration of tube 110 is identical to that of the above-described Embodiment 1.

Figure 10A:
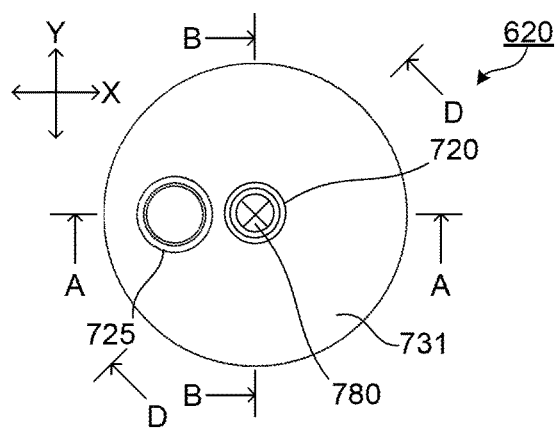
FIG. 10A is a plan view of an emitter according to Embodiment 2.
Figure 10B:
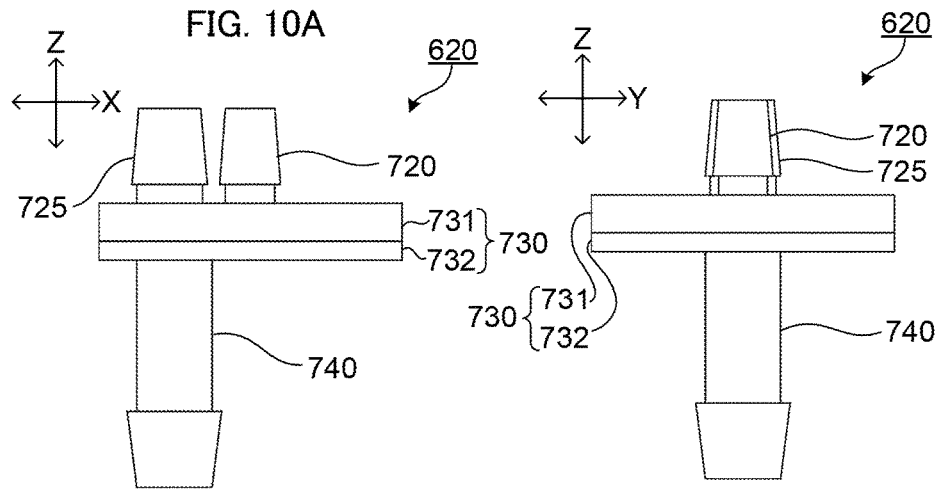
FIG. 10B is a front view of the emitter.
Figure 10D:
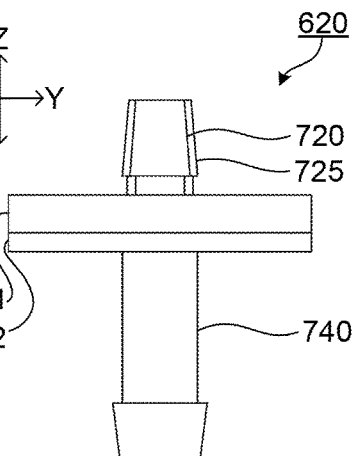
FIG. 10D is a side view of the emitter.
Figure 10C:
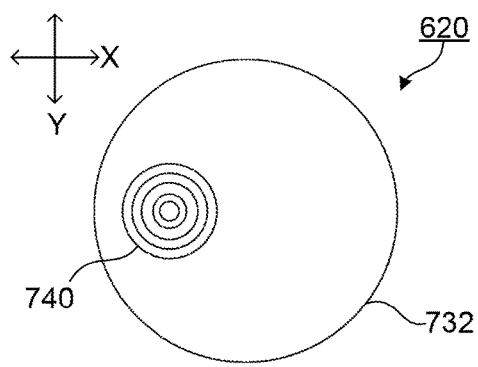
FIG. 10C is a bottom view of the emitter.
Figure 11A:
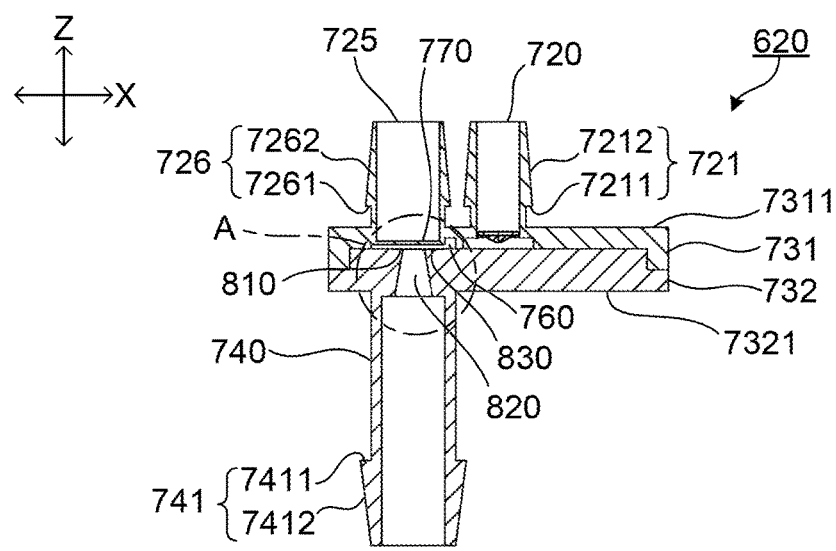
FIG. 11A is a sectional view of the emitter according to Embodiment 2 taken along line A-A of FIG. 10A.
Figure 11B:
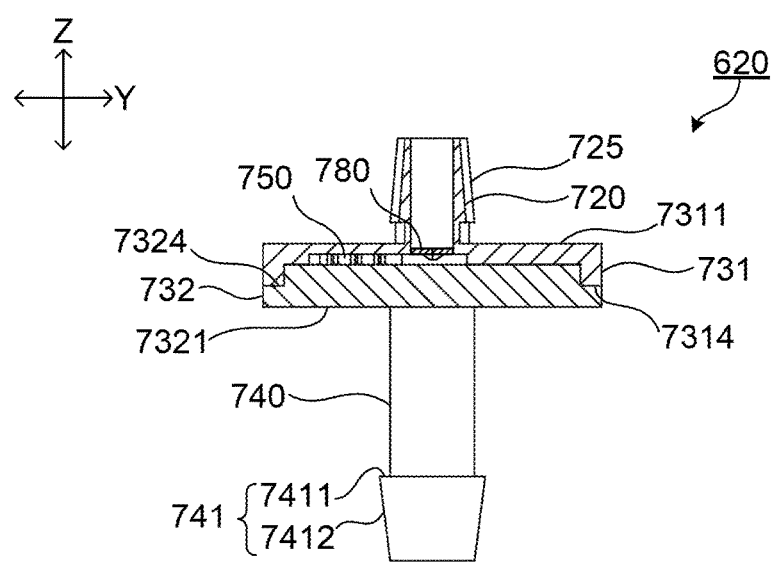
FIG. 11B is a sectional view of the emitter taken along line B-B of FIG. 10A.

FIG. 10A is a plan view of emitter 620, FIG. 10B is a front view of emitter 620, FIG. 10C is a bottom view of emitter 620, and FIG. 10D is a side view of emitter 620. In addition, FIG. 11A is a sectional view of emitter 620 taken along line A-A of FIG. 10A, and FIG. 11B is a sectional view of emitter 620 taken along line B-B of FIG. 10A.

As illustrated in FIG. 10B and FIG. 10C, emitter 620 includes intake part 720, pressure transfer pipe 725, flange section 730 and discharge part 740. Here, the Z direction is a direction along the axis of intake part 720, and includes a direction in which emitter 620 is inserted to tube 110. The X direction is one direction orthogonal to the Z direction, and the Y direction is a direction orthogonal to both of the Z direction and the X direction.

The shape viewed along the Z direction (shape in plan view) of flange part 730 is a circular shape. Flange part 730 has an outer diameter of, for example, 16 mm. As illustrated in FIG. 10A and FIG. 10B, intake part 720 is disposed at a center of flange part 730 in plan view, and pressure transfer pipe 725 and discharge part 740 are disposed at positions shifted in the X direction from a center of flange part 730 as illustrated in FIG. 10B, FIG. 10C and FIG. 10D.

Flange part 730 is composed of a combination of first disk part 731 on intake part 720 and pressure transfer pipe 725 side and second disk part 732 on discharge part 740 side. Intake part 720 and pressure transfer pipe 725 are formed integrally with first disk part 731, and discharge part 740 is formed integrally with second disk part 732. Hereinafter, the integrally molded member of intake part 720, pressure transfer pipe 725 and first disk part 731 is also referred to as "first component," and the integrally molded member of discharge part 740 and second disk part 732 is also referred to as "second component."

As illustrated in FIG. 11A and FIG. 11B, intake part 720 is a cylindrical member uprightly provided on first surface 7311 of first disk part 731. Barb 721 is formed at an end portion of intake part 720. Barb 721 is composed of large diameter part 7211 which expands from the outer peripheral surface of intake part 720 along the XY plane, and tapered surface 7212 whose outer diameter gradually decreases from large diameter part 7211 toward an end of intake part 720. For example, large diameter part 7211 has an outer diameter of 3.2 mm, and the end of tapered surface 7212 has an outer diameter of 2.6 mm.

As with intake part 720, pressure transfer pipe 725 is a cylindrical member uprightly provided on first surface 7311 of first disk part 731 as illustrated in FIG. 11A and FIG. 11B. Barb 726 is formed at an end portion of pressure transfer pipe 725. Barb 726 is composed of large diameter part 7261 which expands from the outer peripheral surface of pressure transfer pipe 725 along the XY plane, and tapered surface 7262 whose outer diameter gradually decreases from large diameter part 7261 toward an end of pressure transfer pipe 725. For example, large diameter part 7261 has an outer diameter of 4 mm, and the end of tapered surface 7262 has an outer diameter of 3.3 mm.

Figure 12A:
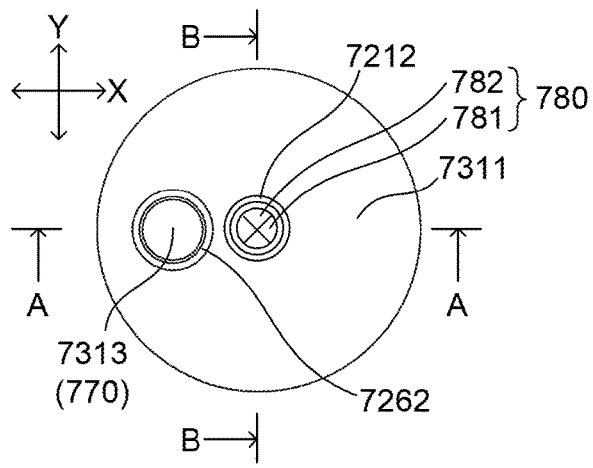
FIG. 12A is a plan view of a first member in Embodiment 2.
Figure 12B:
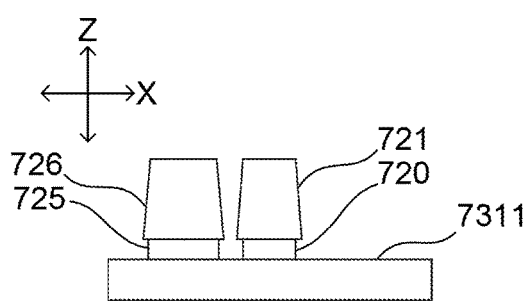
FIG. 12B is a front view of the first member.
Figure 12D:
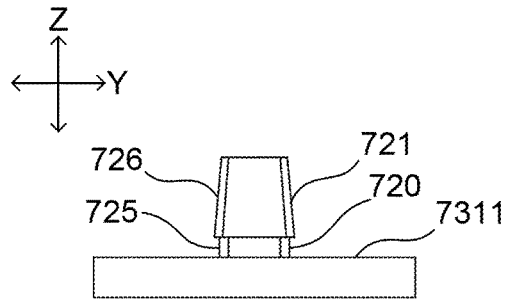
FIG. 12D is a side view of the first member.
Figure 12C:
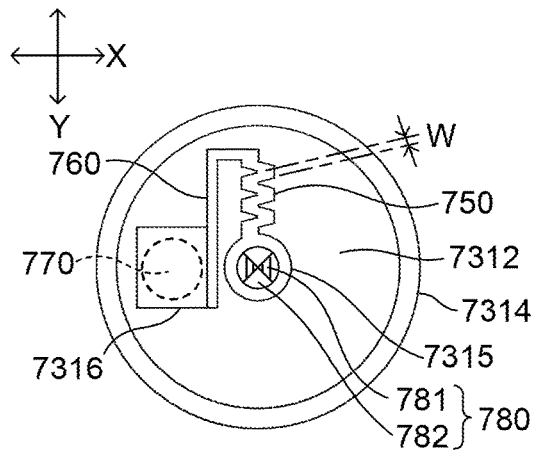
FIG. 12C is a bottom view of the first member.

FIG. 12A is a plan view of the first component, FIG. 12B is a front view of the first component, FIG. 12C is a bottom view of the first component, and FIG. 12D is a side view of the first component. In addition, FIG. 13A is a sectional view of the first component taken along line A-A of FIG. 12A, and FIG. 13B is a sectional view of the first component taken along line B-B of FIG. 12A.

As illustrated in FIG. 12A and FIG. 12C, first disk part 731 includes recess 7313 on first surface 7311 side, and protrusion line 7314, first recess 7315, pressure reduction channel 750, channel 760, second recess 7316 and flow rate regulating valve 780 on second surface 7312 which is an opposite side of first surface 7311 in the Z direction. Flow rate regulating valve 780 corresponds to the liquid receiving amount regulating part.

Figure 13A:
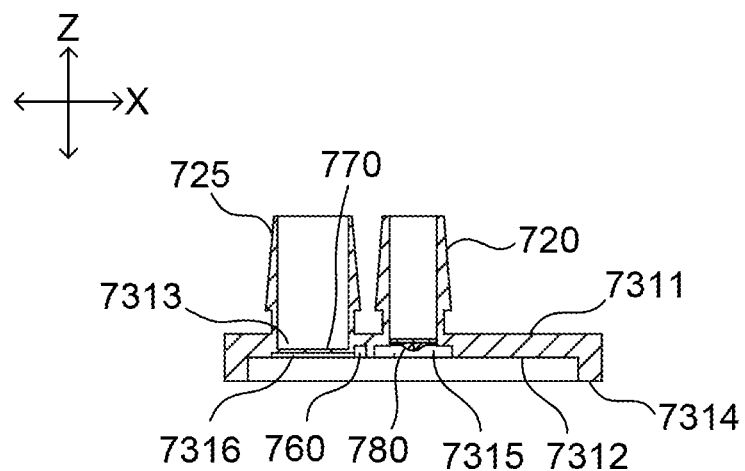
FIG. 13A illustrates a sectional view of the first member in Embodiment 2 taken along line A-A of FIG. 12A.

As illustrated in FIG. 13A, recess 7313 is a recess formed on first surface 7311. In plan view, recess 7313 has a circular shape as illustrated in FIG. 12A. The bottom of recess 7313 composes film 770 described later. Recess 7313 has a diameter of, for example, 3 mm, and recess 7313 has a depth from first surface 7311 of, for example, 0.65 mm. Pressure transfer pipe 725 is in communication with recess 7313.

Figure 13B:
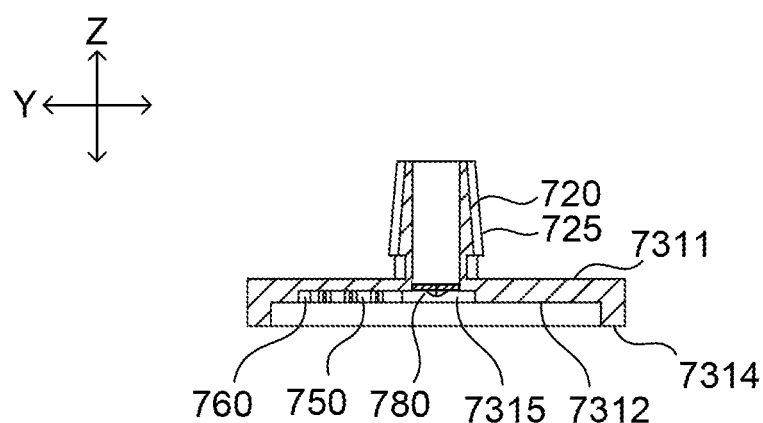
FIG. 13B illustrates a sectional view of the first member taken along line B-B of FIG. 12A.

As illustrated in FIG. 12C, protrusion line 7314 is disposed at the peripheral portion of second surface 7312, and as illustrated in FIG. 13A and FIG. 13B, protrusion line 7314 protrudes from second surface 7312. The height of protrusion line 7314 from second surface 7312 is, for example, 1 mm.

As illustrated in FIG. 12C, first recess 7315 is formed at a center of second surface 7312. In plan view, first recess 7315 has a circular shape. First recess 7315 is in communication with the inside of intake part 720, and the diameter of first recess 7315 is slightly larger than the internal diameter of intake part 720. The depth of first recess 7315 from second surface 7312 is, for example, 0.5 mm.

As illustrated in FIG. 13B, pressure reduction channel 750 is formed as a groove on second surface 7312. As illustrated in FIG. 12C, pressure reduction channel 750 is connected with recess 7315, and extends toward the peripheral portion of second surface 7312 along the radial direction of second surface 7312. In plan view, pressure reduction channel 750 has a zigzag shape as with the above-described pressure reduction channel part 222, and pressure reduction channel 750 has a width (W in FIG. 12C) of, for example, 0.45 mm.

As illustrated in FIG. 13A and FIG. 13B, channel 760 is formed as a groove on second surface 7312. As illustrated in FIG. 12C, at the peripheral portion of second surface 7312, the base end of channel 760 is connected with pressure reduction channel 750, and channel 760 extends along the protruding direction of pressure reduction channel 750. While an end of channel 760 is extended to a region near first recess 7315, the end portion of channel 760 and first recess 7315 are not in communication with each other.

As illustrated in FIG. 13A, second recess 7316 is a recess formed on second surface 7312. As illustrated in FIG. 12C, second recess 7316 is adjacent to an end portion of channel 760, and has a rectangular shape in plan view. In the Z direction, second recess 7316 overlaps recess 7313 on first surface 7311 side, and this overlapping part is thin film 770. Accordingly, film 770 has a circular shape in plan view. The depth of second recess 7316 from second surface 7312 is, for example, 0.2 mm, and the thickness of film 770 is, for example, 0.15 mm. The thickness of film 770 is determined by a computer simulation or an experiment using a trial product or the like on the basis of the deformation amount under a pressure described later, for example.

As with emitter 120, flow rate regulating valve 780 is composed of a valve element and a fixed part. In plan view, each of valve element 781 and fixed part 782 is a circular sector which is obtained by dividing a circle into four parts, and valve element 781 and fixed part 782 are alternately disposed in a circumferential direction. Valve element 781 and fixed part 782 are disposed at positions where the free ends of valve element 781 and fixed part 782 intersect with each other at 45° with respect to the X direction or the Y direction in plan view (FIG. 12C). Fixed part 782 is composed of a flat plate. The arc portion of valve element 781 is a fixed end, and the radius of valve element 781 is a free end.

Valve element 781 and fixed part 782 are disposed such that the free end edge of valve element 781 on the upstream side is in contact with the free end edge of fixed part 782 on the downstream side. Valve element 781 is composed of flexible thin part 7811 extending from the fixed end, and thick part 7812 extending from thin part 7811. The thickness of thin part 7811 is uniform from the arc as the fixed end, and is sufficiently thin relative to fixed part 782 (see FIGS. 15A and 15B).

Figure 15A:
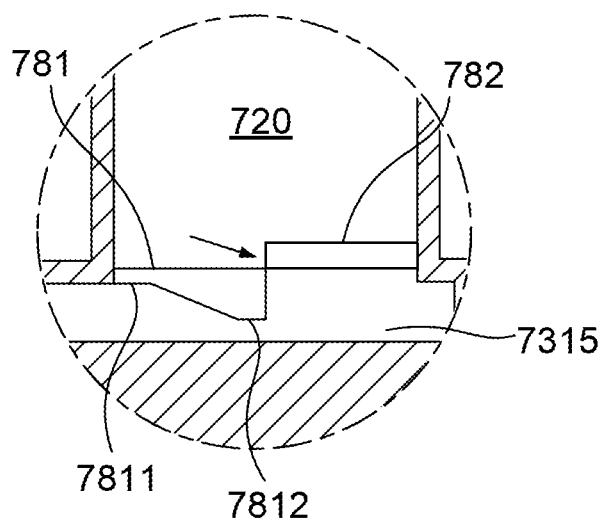
FIG. 15A illustrates a cross-section in an enlarged manner of the emitter according to Embodiment 2 taken along line D-D of FIG. 10A in the case where the pressure of the irrigation liquid in the tube is lower than a predetermined value.
Figure 15B:
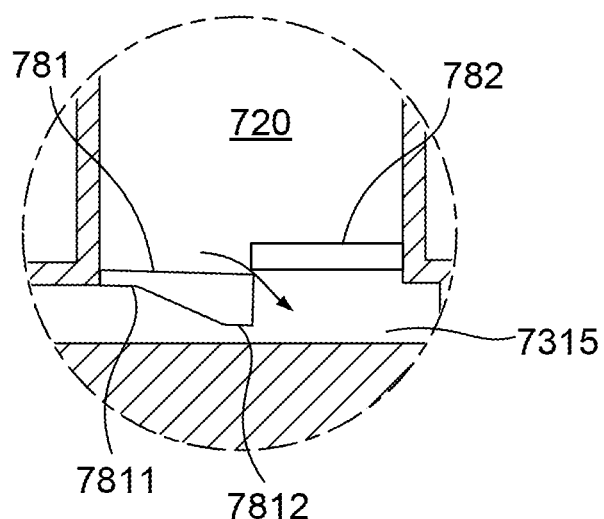
FIG. 15B illustrates a cross-section of the emitter taken along line D-D of FIG. 10A in an enlarged manner in the case where the pressure of the irrigation liquid in the tube is equal to or higher than the predetermined value.

Thick part 7812 is a thick portion protruding to the downstream side of the intake part. Thick part 7812 has a substantially triangular pyramidal shape protruding toward first recess 7315 for example. The bottom surface of thick part 7812 has a rectangular equilateral triangular shape with the vertex at the center of the circular sector of valve element 781 (FIG. 12C), and has two wall surfaces provided in an upright manner from the free end on the downstream side, and a tilted surface obliquely extending toward the downstream side from the hypotenuse of the rectangular triangle (FIGS. 15A and 15B). In plan view, the boundary between thin part 7811 and thick part 7812 is a straight line. The apex of thick part 2142 is slightly cut out such that, for example, the distance between second surface 7322 of second disk part 732 and thick part 7812 is about 0.5 mm.

As illustrated in FIG. 11A, discharge part 740 is a cylindrical member uprightly provided on first surface 7321 of second disk part 732. As with intake part 720, barb 741 is formed at an end portion of discharge part 740. Barb 741 is composed of large diameter part 7411 which expands from the outer peripheral surface of discharge part 740 along XY plane, and tapered surface 7412 whose outer diameter gradually decreases from large diameter part 7411 toward an end of discharge part 740. For example, large diameter part 7411 has an outer diameter of 5 mm, and the end of tapered surface 7412 has an outer diameter of 4 mm.

Figure 14A:
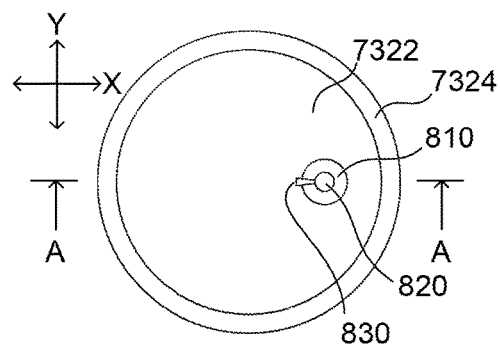
FIG. 14A is a plan view of the second member of Embodiment 2.
Figure 14B:
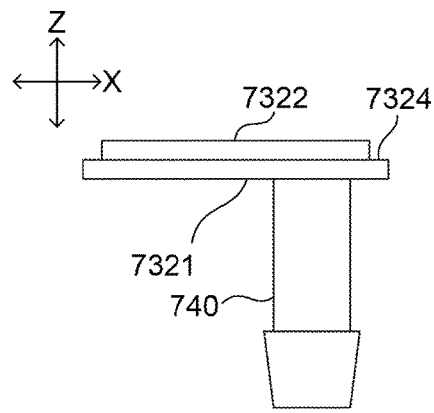
FIG. 14B is a front view of the second member.
Figure 14D:
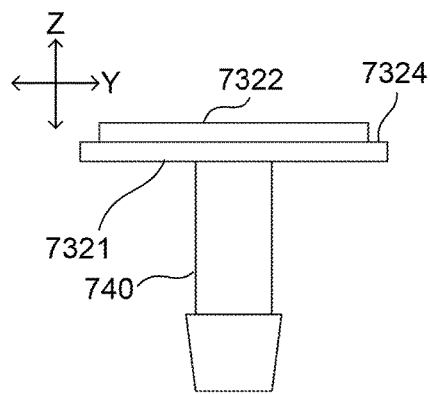
FIG. 14D is a side view of the second member.
Figure 14C:
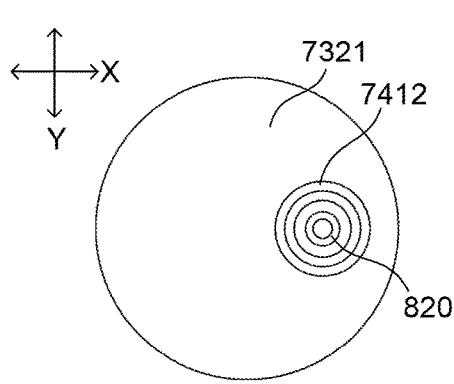
FIG. 14C is a bottom view of the second member.
Figure 14E:
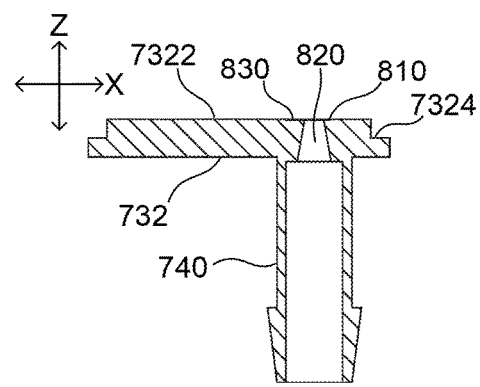
FIG. 14E is a sectional view of the second member taken along line A-A of FIG. 14A.

FIG. 14A is a plan view of the second component, FIG. 14B is a front view of the second component, FIG. 14C is a bottom view of the second component, FIG. 14D is a side view of the second component, and FIG. 14E is a sectional view of the second component taken along line A-A of FIG. 14A. Second disk part 732 includes recessed line 7324, valve seat part 810, hole 820 and groove 830. The discharge rate regulating part is composed of film 770, valve seat part 810, hole 820 and groove 830.

As illustrated in FIG. 14A, recessed line 7324 is disposed at the peripheral portion of second surface 7322 which is an opposite side of first surface 7321 in the Z direction, and, as illustrated in FIG. 14B and FIG. 14D, is depressed from second surface 7322. The depth of recessed line 7324 from second surface 7322 is, for example, 1 mm.

As illustrated in FIG. 11A, valve seat part 810 is a recess formed at a position facing film 770 in second surface 7322. In plan view, valve seat part 810 has a circular shape as illustrated in FIG. 14A. Valve seat part 810 has a diameter of, for example, 1.8 mm. Valve seat part 810 is formed with a curved surface slightly depressed from second surface 7322, and is formed such that film 770 makes close contact with at least a part surrounding hole 820 of valve seat part 810 when film 770 is bent under a pressure of the irrigation liquid having a value equal to or higher than a predetermined value in pressure transfer pipe 725 in pressure transfer pipe 725.

As illustrated in FIG. 14A, hole 820 opens at a center portion of valve seat part 810. The opening of hole 820 on valve seat part 810 side has a circular shape. As illustrated in FIG. 14E, hole 820 extends through second disk part 732 along the Z direction, and is in communication with the inside of discharge part 740. The opening of hole 820 on valve seat part 810 side has a diameter of, for example, 1 mm, and is smaller than the opening on discharge part 740 side. That is, hole 820 is a tapered hole whose diameter gradually increases from valve seat part 810 side toward discharge part 740 side along the Z direction.

As illustrated in FIG. 14E, groove 830 is formed on second surface 7322 including valve seat part 810 so as to cross valve seat part 810 along the radial direction thereof. In emitter 620, groove 830 communicates between channel 760 and hole 820 as illustrated in FIG. 11A. Groove 830 has a width of, for example, 0.2 mm, and has a depth from second surface 7322 of, for example, 0.05 mm.(see FIG. 16A to FIG. 16C).

As with emitter main body 200 of Embodiment 1, each of the first component and second component is integrally molded by injection molding using one resin material having flexibility (for example, polypropylene). It is to be noted that examples of the material of the first component and second component include resin and rubber, and examples of the resin include polyethylene and silicone. The flexibility of the material is properly adjusted by the type of the resin material, mixture of two or more resin materials or the like in accordance with the flexibility required for film 770.

Emitter 620 is configured such that protrusion line 7314 of first disk part 731 is fitted with recessed line 7324 of second disk part 732 to bring second surface 7312 of first disk part 731 and second surface 7322 of second disk part 732 into close contact with each other (FIGS. 11A and 11B). Further, second surfaces 7312 and 7322 may be joined by welding of a resin material, by bonding using an adhesive agent, by pressure bonding of one of them to the other or the like.

Emitter 620 is attached to tube 110 by inserting intake part 720 and pressure transfer pipe 725 to the tube wall of tube 110 (FIG. 9). Emitter 620 may be attached to tube 110 by penetrating the tube wall of tube 110 with intake part 720 and pressure transfer pipe 725, or by inserting intake part 720 and pressure transfer pipe 725 to an opening part for insertion which is preliminarily formed on the tube wall of tube 110. The former configuration is favorable for freely attaching emitter 620 to tube 110, and the latter configuration is favorable for preventing leakage of irrigation liquid from tube 110. Since intake part 720 and pressure transfer pipe 725 each has a barb at an end portion thereof, dropping of emitter 620 from tube 110 is prevented.

Next, flow of the irrigation liquid (for example, water) in emitter 620 is described.

Supply of water to trickle irrigation tube 500 is performed in a range where the pressure of the water does not exceed 0.1 MPa in view of preventing damaging of tube 110 and emitter 620. When the irrigation liquid is supplied into tube 110, the water reaches flow rate regulating valve 780 through intake part 720, and pressure transfer pipe 725 is filled with the water.

FIG. 15A illustrates a cross-section of emitter 620 taken along line D-D of FIG. 10A in an enlarged manner in the case where the water pressure in intake part 720 is lower than a predetermined value, and FIG. 15B illustrates a cross-section of emitter 620 taken along line D-D of FIG. 10A in an enlarged manner in the case where the water pressure in intake part 720 is equal to or higher than a predetermined value. The arrow in FIGS. 15A and 15B indicates the flow of the water.

The water in intake part 720 presses valve element 781 and fixed part 782 toward first recess 7315 side from intake part 720 side. When the water pressure in intake part 720 is lower than a predetermined value (for example, 0.005 MPa), each of valve element 781 and fixed part 782 is not bent to first recess 7315 side as illustrated in FIG. 15A, and the water channel is closed by valve element 781 and fixed part 782.

Since thin part 7811 is thinner than fixed part 782, when the water pressure in intake part 720 is equal to or higher than the predetermined value, fixed part 782 is not bent and only thin part 7811 is bent as illustrated in FIG. 15B. Consequently, while fixed part 782 is not bent to first recess 7315 side, only valve element 781 is bent to first recess 7315 side. In this manner, a gap is formed between valve element 781 and fixed part 782, and the water in intake part 720 is supplied to first recess 7315 through the gap.

Thus, flow rate regulating valve 780 suppresses distribution of the water in emitter 620 when the pressure of the water is lower than the above-mentioned predetermined value. Consequently, the water can be quickly and stably supplied to tube 110 with a high pressure, and therefore the configuration in which emitter 620 has flow rate regulating valve 780 is favorable for forming trickle irrigation tube 500 having a greater length, for example.

The water in first recess 7315 is supplied to pressure reduction channel 750. The pressure of the irrigation liquid flowing through pressure reduction channel 750 is reduced as a result of pressure reduction caused by the shape of reduction channel 750 in plan view (zigzag shape). In addition, floating materials in the irrigation liquid are entangled in the turbulent flow generated between the above-mentioned protrusions of pressure reduction channel 750, and retained in pressure reduction channel 750. In this manner, the floating materials are further removed from irrigation liquid by pressure reduction channel 750.

The water having passed through pressure reduction channel 750 in which the pressure is reduced and the floating materials are removed is supplied to second recess 7316 (the space sandwiched by film 770 and valve seat part 810) through channel 760 and passes through hole 820.

Figure 16A:
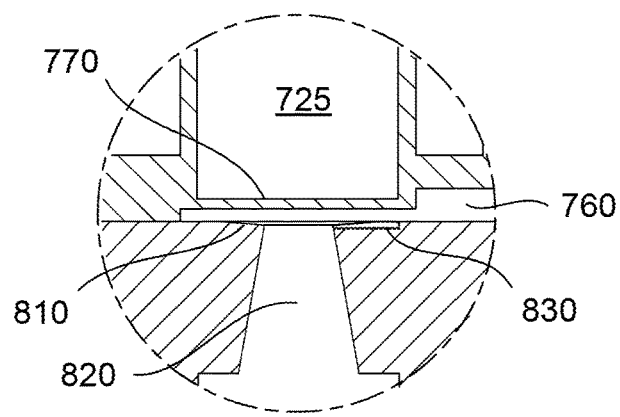
FIG. 16A schematically illustrates a state of part A of FIG. 11A in the case where the pressure of the irrigation liquid in the tube is equal to or higher than the first predetermined value, FIG. 16B schematically illustrates a state of part A of FIG. 11A in the case where the pressure of the irrigation liquid in the tube is equal to or higher than the first predetermined value and lower than the second predetermined value, and FIG. 16C schematically illustrates a state of part A of FIG. 11A in the case where the pressure of the irrigation liquid in the tube is equal to or higher than the second predetermined value.
Figure 16B:
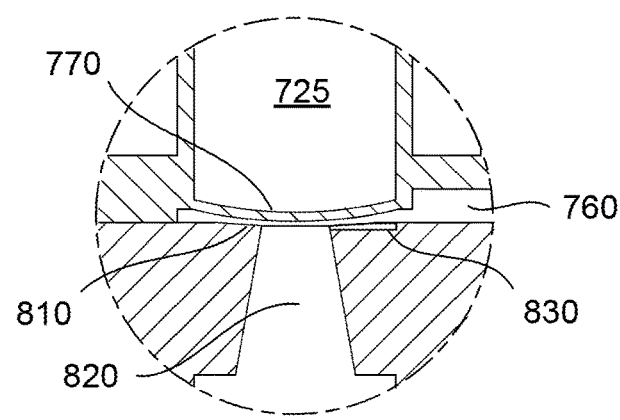
Figure 16C:
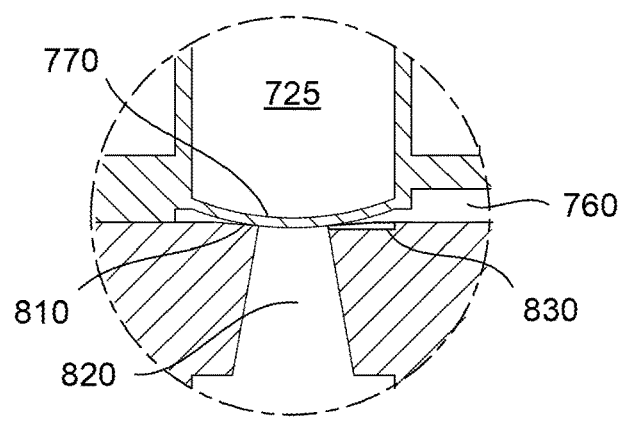

FIG. 16A schematically illustrates a state of part A of FIG. 11A in the case where the pressure of the water in tube 110 is equal to or higher than the first predetermined value and is lower than the second predetermined value, FIG. 16B schematically illustrates a state of part A of FIG. 11A in the case where the pressure of the water in tube 110 is equal to or higher than the first predetermined value and is lower than the second predetermined value, and FIG. 16C schematically illustrates a state of part A of FIG. 11A in the case where the pressure of the water in tube 110 is equal to or higher than the second predetermined value.

When the pressure of the water in tube 110 is equal to or higher than the first predetermined value (for example, 0.02 MPa), the flow rate of the water received by emitter 620 from intake part 720 and the amount of the water supplied to second recess 7316 increase as the pressure of the water in tube 110 increases.

Meanwhile, when the pressure of the water in tube 110 is equal to or higher than the first predetermined value and lower than the second predetermined value, film 770 is pushed and bent by the water in pressure transfer pipe 725 as illustrated in FIG. 16B. Since no structure which causes pressure reduction is provided inside pressure transfer pipe 725, the pressure of the water in pressure transfer pipe 725 is substantially the same as that of the water in tube 110. In this manner, pressure transfer pipe 725 transmits the pressure of the water in tube 110 to the rear surface of film 770. Thus, film 770 is pushed from pressure transfer pipe 725 side by the pressure of the water in the tube, and the distance between film 770 and valve seat part 810 is reduced. For example, the distance is changed to 0.25 mm to 0.15 mm. Consequently, the amount of the water which passes between film 770 and valve seat part 810 is reduced, and the increase of the discharge rate of the water from discharge part 740 is suppressed.

When the pressure of the water in tube 110 is equal to or higher than the second predetermined value (for example, 0.05 MPa), film 770 is pushed and further bent by the water in tube 110 and brought into close contact with valve seat part 810 as illustrated in FIG. 16C. In this manner, film 770 functions as a valve element for restricting the distribution of water, and valve seat part 810 functions as a valve seat. Meanwhile, since groove 830 is not sealed even when film 770 makes close contact with valve seat part 810, the water having passed through channel 760 is supplied to hole 820 through groove 830. Consequently, the amount of the water which passes through hole 820 is restricted to a flow rate which can pass through groove 830, and the discharge rate of the water from discharge part 740 becomes substantially constant.

In this manner, emitter 620 quantitatively discharges the water in tube 110.

As described, emitter 620 includes: intake part 720 for receiving water in tube 110 for distributing the irrigation liquid, intake part 720 having a cylindrical shape to be inserted to tube 110 from outside of tube 110; flow rate regulating valve 780 for regulating the flow rate of the water received from intake part 720; pressure reduction channel 750 for allowing the water supplied from flow rate regulating valve 780 to flow therethrough while reducing a pressure of the water; a discharge rate regulating part for controlling a flow rate of the water supplied from pressure reduction channel 750 in accordance with the pressure of water in tube 110; and discharge part 740 for discharging the water whose flow rate regulated by the discharge rate regulating part to the outside of tube 110. When one end of intake part 720 from which intake part 720 is inserted to tube 110 is a tip end and the other end of intake part 720 is a base end, flange part 730 is disposed at the base end of intake part 720. Flange part 730 is composed of a combination of first disk part 731 disposed at the base end of intake part 720 and second disk part 732 on which discharge part 740 is disposed, flange part 730 including at least pressure reduction channel 750 and the discharge rate regulating part. In addition, flow rate regulating valve 780 includes valve element 781 which extends from the fixed end in the channel in emitter 620 and opens to the downstream side when receiving the pressure of the water on the upstream side of flow rate regulating valve 780, and valve element 781 includes flexible thin part 7811 extending from the fixed end and thick part 7812 extending from thin part 7811. When intake part 720 is inserted to tube 110, emitter 620 is disposed to tube 110, and trickle irrigation tube 500 is formed. In flow rate regulating valve 780, thin part 7811 bends and valve element 781 opens to the downstream side when the water pressure in intake part 720 is equal to or higher than the predetermined value. With this configuration, emitter 620 does not allow the water to flow in emitter 620 when the water pressure in tube 110 is low, but allows the water to flow in emitter 620 when the water pressure in tube 110 is equal to or higher than the predetermined value, and thus the discharge rate of the water from emitter 620 can be stabilized.

Further, since the above-described components of emitter 620 are composed of a recess and a through hole formed on the first surface or the second surface of the first component and the second component, each of the first component and the second component can be integrally produced by injection molding. Therefore, emitter 620 can further reduce manufacturing cost in comparison with conventional emitters composed of three parts.

In addition, the configuration in which the boundary between thick part 7812 and thin part 7811 has a straight line shape in plan view and thick part 7812 is thick on the downstream side thereof is further effective from the viewpoint of increasing the ease of opening of valve element 781 to the downstream side, reducing the predetermined value for opening and closing valve element 781, and the viewpoint of more precisely performing the opening and closing of valve element 781.

In addition, the configuration in which the pressure-regulating valve 780 further includes fixed part 782 disposed at a position adjacent to valve element 781 in plan view, each of valve element 781 and fixed part 782 has a circular sector in plan view, and valve element 781 and fixed part 782 are alternately disposed in the circumferential direction in plan view is further effective from the viewpoint of increasing the productivity of the first member by injection molding.

In addition, with the configuration in which first disk part 731 includes pressure reduction channel 750, pressure transfer pipe 725 and film 770 and second disk part 732 includes valve seat part 810, hole 820 and groove 830, each of the first component and the second component can be fabricated with a further simplified structure, which is further effective from the viewpoint of further reducing manufacturing cost.

Further, with the configuration in which first disk part 731 and second disk part 732 are integrally formed with the same material, emitter 620 can be produced with one component, which is favorable from the viewpoint of further reducing manufacturing cost.

In addition, the discharge rate regulating part includes: film 770 having flexibility and disposed to face a channel on a downstream side of pressure reduction channel 750; pressure transmission part for transmitting a pressure of the irrigation liquid in the tube to a rear surface of film 770; valve seat part 810 depressed with respect to film 770 and disposed at the channel on the downstream side of pressure reduction channel 750 without making contact with film 770, valve seat part 810 being capable of making close contact with film 770; hole 820 which opens to valve seat part 810 and is in communication with discharge part 740; and groove 830 formed at valve seat part 810 and communicating between the hole 820 and the channel located outside relative to valve seat part 810, in which film 770 makes close contact with valve seat part 810 when a pressure of the irrigation liquid in tube 110 is equal to or higher than a predetermined value. Thus, the discharge rate of the water of emitter 620 when the water pressure in tube 110 is high can be suppressed to a desired amount, and the discharge rate of water of emitter 620 can be maintained at a constant value regardless of increase of the water pressure in tube 110, which is further effective from the viewpoint of stabilizing the discharge rate of the water of emitter 620.

In addition, the configuration in which valve seat part 810 is formed such that valve seat part 810 can make close contact with film 770 deformed by the water pressure in tube 110 is further effective from the viewpoint of stably discharging water from emitter 620 with a desired amount.

It is to be noted that, as long as the above-described effect is achieved, the above-mentioned configurations of trickle irrigation tube 500 or emitter 620 may be partially changed, or trickle irrigation tube 500 or emitter 620 may further have other configurations.

Figure 17A:
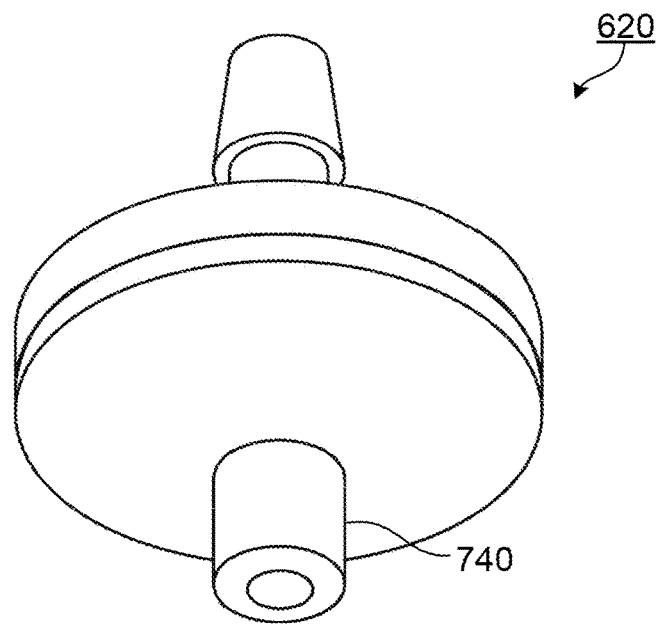
FIG. 17A schematically illustrates a first modification of a discharge part the emitter according to Embodiment 2, and FIG. 17B schematically illustrates a second modification of the discharge part.
Figure 17B:
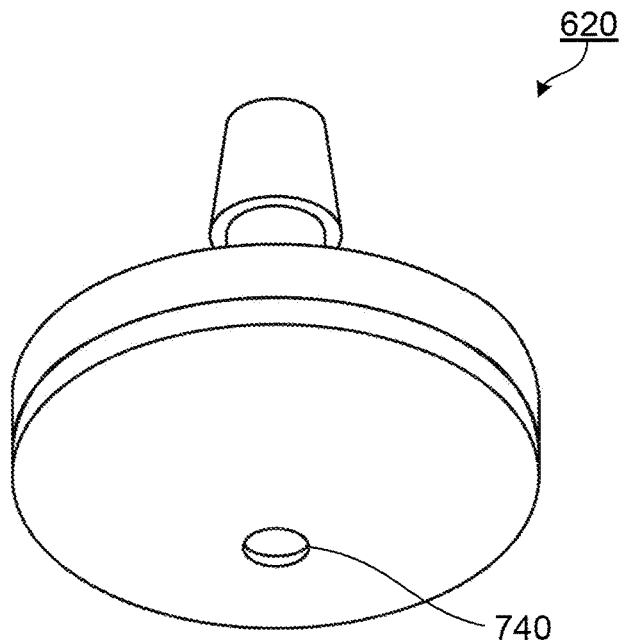

For example, discharge part 740 may not have barb 741 as illustrated in FIG. 17A, and may be an opening part which opens at first surface 7321 of second disk part 732 as illustrated in FIG. 17B.

In addition, tube 110 may be a seamless tube, a tube composed of slender sheet(s) joined together along the longitudinal direction, or a tube having a gap formed at the above-mentioned joining part of the sheet(s) so as to communicate between the inside and the outside of tube 110, or a pipe sandwiched by the sheets at the joining part.

In addition, the first component and the second component may be integrally formed so as to be turnable about a hinge part integrally formed with the first component and the second component. In this case, the number of components of emitter 620 can be further reduced, that is, emitter 620 can be produced with one component.

While the liquid receiving amount regulating part is composed of valve element 781 and fixed part 782, valve element 781 and fixed part 782 may not be alternately disposed in a plane direction (circumferential direction), or the liquid receiving amount regulating part may not include fixed part 782 and may be composed only of valve element 781. In addition, valve element 781 may be a segment having a uniform thickness as long as valve element 781 is a valve element which appropriately opens with a pressure equal to or higher than a predetermined water pressure.

In addition, pressure reduction channel part 750 may have any configuration as long as the pressure reduction part can appropriately reduce the pressure of the water to be supplied to the discharge rate regulating part, and may be a channel having a linear shape in plan view, or, a channel whose planar dimension changes in accordance with the water pressure in tube 110, for example.

In addition, valve seat part 810 may have any configuration as long as valve seat part 810 can make close contact with film 770 at a position around hole 820, and may be a plane surface part, for example.

While film 770 directly performs the opening and closing of the channel (hole 820) in emitter 620 in the present embodiment, the discharge rate regulating part may also have a configuration in which a closure capable of opening and closing the channel in emitter 620 is opened and closed by bringing film 770 close to the closure and separating film 770 from the closure. Also with the discharge rate regulating part having such a configuration, the discharge rate can be appropriately regulated in accordance with the water pressure in tube 110.

In addition, emitter 620 may include, in place of pressure transfer pipe 725, a part for transmitting to film 770 bend of film 770 in accordance with the pressure of the water in tube 110, or, a part capable of directly or indirectly transmitting to the rear surface of film 770 the pressure of the water in the tube.

In addition, flow rate regulating valve 780 may be disposed in intake part 720.

This application is entitled to and claims the benefit of Japanese Patent Application No. 2013-245228 filed on Nov. 27, 2013, and Japanese Patent Application No. 2014-206483 filed on Oct. 7, 2014 the disclosure each of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the above-mentioned emitter in technical fields such as trickle irrigations and endurance tests where long-term dropping is required, and further development of the technical fields can be expected.

REFERENCE SIGNS LIST 100, 500 Trickle irrigation tube
110 Tube
120, 620 Emitter
130 Discharge port
200 Emitter main body
201, 7311, 7321 First surface
202, 7312, 7322 Second surface
211, 216, 221, 231, 241, 252, 7313 Recess
213, 242, 7314 Protrusion line
214, 781 Valve element
215, 782 Fixed part
222 Pressure reduction channel part
223, 234, 820 Hole
232, 251 Protrusion
233 End surface
235, 830 Groove
300, 770 Film
301 Slit
302 Diaphragm part
303 Positioning hole
304 Hinge part
720 Intake part
721, 726, 741 Barb
725 Pressure transfer pipe
730 Flange section
731 First disk part
732 Second disk part
740 Discharge part
750 Pressure reduction channel
760 Channel
780 Flow rate regulating valve
810 Valve seat part
2141, 7811 Thin part
2142, 7812 Thick part
2331 Outer ring part
2332 Tilted surface
2411 First portion
2412 Second portion
2413 Tilted part
7211, 7261, 7411 Large diameter part
7212, 7262, 7412 Tapered surface
7315 First recess
7316 Second recess
7324 Recessed line

The invention claimed is:

1. An emitter for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter comprising:

an emitter main body including a resin molded body including at least a recess and a through hole;
a film joined to at least one surface of the emitter main body, the film forming a channel by sealing at least a part of an opening of the recess and the through hole;
an intake part for receiving the irrigation liquid in the tube;
a liquid receiving amount regulating part for regulating a flow rate of the irrigation liquid received from the intake part;
a pressure reduction channel for allowing the irrigation liquid supplied from the liquid receiving amount regulating part to flow therethrough while reducing a pressure of the irrigation liquid;
a discharge rate regulating part for regulating the flow rate of the irrigation liquid supplied from the pressure reduction channel in accordance with a pressure of the irrigation liquid in the tube; and
a discharge part to which the irrigation liquid, having a flow rate regulated by the discharge rate regulating part, is supplied, the discharge part being configured to face the discharge port, wherein:
the liquid receiving amount regulating part includes:
a valve element which extends from a fixed end of a channel of the irrigation liquid in the emitter and opens to a downstream side when receiving a pressure of the irrigation liquid on an upstream side, and
a fixed part disposed at a position adjacent to the valve element in plan view,
each of the valve element and the fixed part has a shape of a circular sector in plan view,
wherein the shape of the circular sector is a portion of a disk enclosed by two radii and an arc, and
wherein the valve element and the fixed part are alternately disposed in a circumferential direction in plan view,
the valve element includes a thin part having flexibility and extending from the fixed end, and a thick part extending from the thin part,
the thin part bends and the valve element opens to the downstream side when a pressure of the irrigation liquid on an upstream side of the liquid receiving amount regulating part is equal to or higher than a predetermined value,
the emitter main body includes a part of the intake part, the liquid receiving amount regulating part, the pressure reduction channel, a part of the discharge rate regulating part, and the discharge part, and
the valve element and parts of the emitter main body other than the valve element are integrally molded with one material having flexibility.

2. The emitter according to claim 1, wherein:
a boundary between the thick part and the thin part has a straight line shape in plan view, and
a thickness of the thick part is greater than a thickness of the thin part on a downstream side of the valve element.

3. The emitter according to claim 1, wherein:
the valve element is disposed such that a free end edge of the valve element on the upstream side is in contact with a free end edge of the fixed part on the downstream side.

4. The emitter according to claim 1, wherein:
the emitter main body and the film are integrally molded with the one material having flexibility.

5. The emitter according to claim 1, wherein:
the discharge rate regulating part includes:
- the film having flexibility and disposed to block a communication between a channel on a downstream side of the pressure reduction channel and the inside of the tube,
- a valve seat part depressed with respect to the film and disposed at the channel on the downstream side of the pressure reduction channel without making contact with the film, the valve seat part being capable of making close contact with the film,
- a hole which opens at the valve seat part and is in communication with the discharge part, and
- a groove formed at the valve seat part and communicating between the hole and the channel located outside relative to the valve seat part, and the film makes close contact with the valve seat part when the pressure of the irrigation liquid in the tube is equal to or higher than a predetermined value.

6. A trickle irrigation tube comprising:
a tube; and
at least one emitter, the at least one emitter being the emitter according to claim 1 disposed on the tube.

* * * * *